United States Patent
Chang et al.

(10) Patent No.: US 8,966,195 B2
(45) Date of Patent: Feb. 24, 2015

(54) DIRECT MEMORY ACCESS AND SUPER PAGE SWAPPING OPTIMIZATIONS FOR A MEMORY BLADE

(75) Inventors: Jichuan Chang, Mountain View, CA (US); Kevin Lim, Ann Arbor, MI (US); Partha Ranganathan, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1093 days.

(21) Appl. No.: 12/492,537

(22) Filed: Jun. 26, 2009

(65) Prior Publication Data

US 2010/0332720 A1    Dec. 30, 2010

(51) Int. Cl.
*G06F 12/08*    (2006.01)
*G06F 9/50*    (2006.01)
*G06F 9/455*    (2006.01)

(52) U.S. Cl.
CPC .......... *G06F 9/5016* (2013.01); *G06F 9/45537* (2013.01); *G06F 12/08* (2013.01)
USPC ........................................... 711/159; 711/203

(58) Field of Classification Search
CPC ................................ G06F 12/00; G06F 12/12
USPC ................................................. 711/159, 203
See application file for complete search history.

(56) References Cited

U.S. PATENT DOCUMENTS

| | | | | |
|---|---|---|---|---|
| 5,388,242 A | * | 2/1995 | Jewett | 711/113 |
| 5,784,459 A | * | 7/1998 | Devarakonda et al. | 713/165 |
| 6,003,117 A | * | 12/1999 | Buer et al. | 711/163 |
| 7,103,747 B2 | * | 9/2006 | Wilson et al. | 711/206 |
| 7,680,987 B1 | * | 3/2010 | Clark et al. | 711/147 |
| 8,171,255 B1 | * | 5/2012 | Koryakin et al. | 711/207 |
| 2007/0067604 A1 | * | 3/2007 | Elnozahy et al. | 711/207 |
| 2008/0077767 A1 | * | 3/2008 | Khosravi et al. | 711/216 |
| 2008/0201540 A1 | * | 8/2008 | Sahita et al. | 711/159 |
| 2010/0306770 A1 | * | 12/2010 | Frank | 718/1 |

OTHER PUBLICATIONS

Intel Virtualization Technology for Directed I/O. Aug. 10, 2006. Intel Virtualization Technology. vol. 10 Issue 3. http://download.intel.com/technology/itj/2006/v10i3/v10-i3-art02.pdf.*

* cited by examiner

*Primary Examiner* — Tuan Thai
(74) *Attorney, Agent, or Firm* — Hewlett-Packard Patent Department

(57) ABSTRACT

A system and method is illustrated for identifying an Input/Output (I/O) driver module, using a hypervisor, to receive a read command to read a virtual memory page from a remote memory location. Further, the system and method includes reading the remote virtual memory page, using the I/O driver module, into a memory buffer managed by the I/O driver module. Additionally, the system and method includes storing the virtual memory page in the memory buffer to a persistent storage device. The system and method also includes identifying a remote super page, using a hypervisor, the remote super page including a remote sub page. Additionally, the system and method includes identifying a local super page, using the hypervisor, the local super page including a local sub page. Further, the system and method includes swapping the local sub page for the remote sub page, using the hypervisor, the swapping occurring over a network.

17 Claims, 20 Drawing Sheets

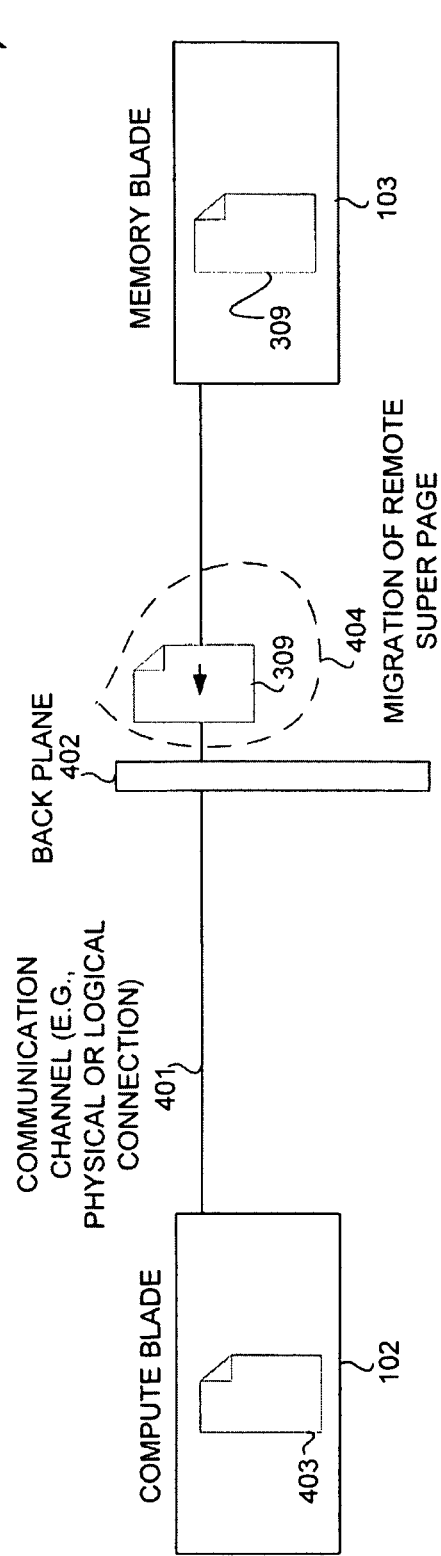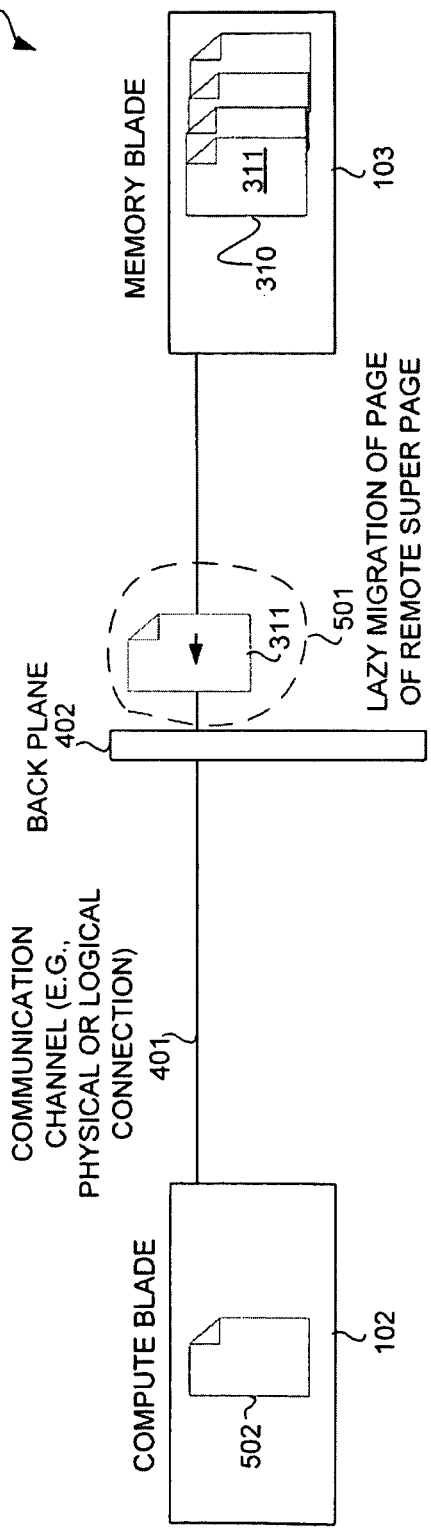

DIRECT MEMORY ACCESS AND SUPER PAGE SWAPPING OPTIMIZATIONS FOR A MEMORY BLADE

CROSS REFERENCE TO RELATED APPLICATIONS

This is non-provisional patent application is related to Patent Cooperation Treaty Application Number PCT/US2008/069168 entitled "MEMORY SERVER" that was filed on Jul. 3, 2008, and which is incorporated by reference in its entirety.

BACKGROUND

Direct Memory Access (DMA) is used by modules within a computer system to access system memory for reading and writing independently of a Central Processing Unit (CPU). These modules include disk drive controllers, graphics card, network cards, sound cards, and Graphic Processing Units (GPU). DMA may be used in conjunction with multi-core computer systems.

BRIEF DESCRIPTION OF THE DRAWINGS

Some embodiments of the invention are described, by way of example, with respect to the following figures:

FIG. 4 is a diagram of a system, according to an example embodiment, illustrating the swapping of a remote memory page in the form of a sub page or super page.

FIG. 5 is a diagram of a system, according to an example embodiment, that is used to implement lazy swapping of a remote sub page or super page.

DETAILED DESCRIPTION

Figure 1:
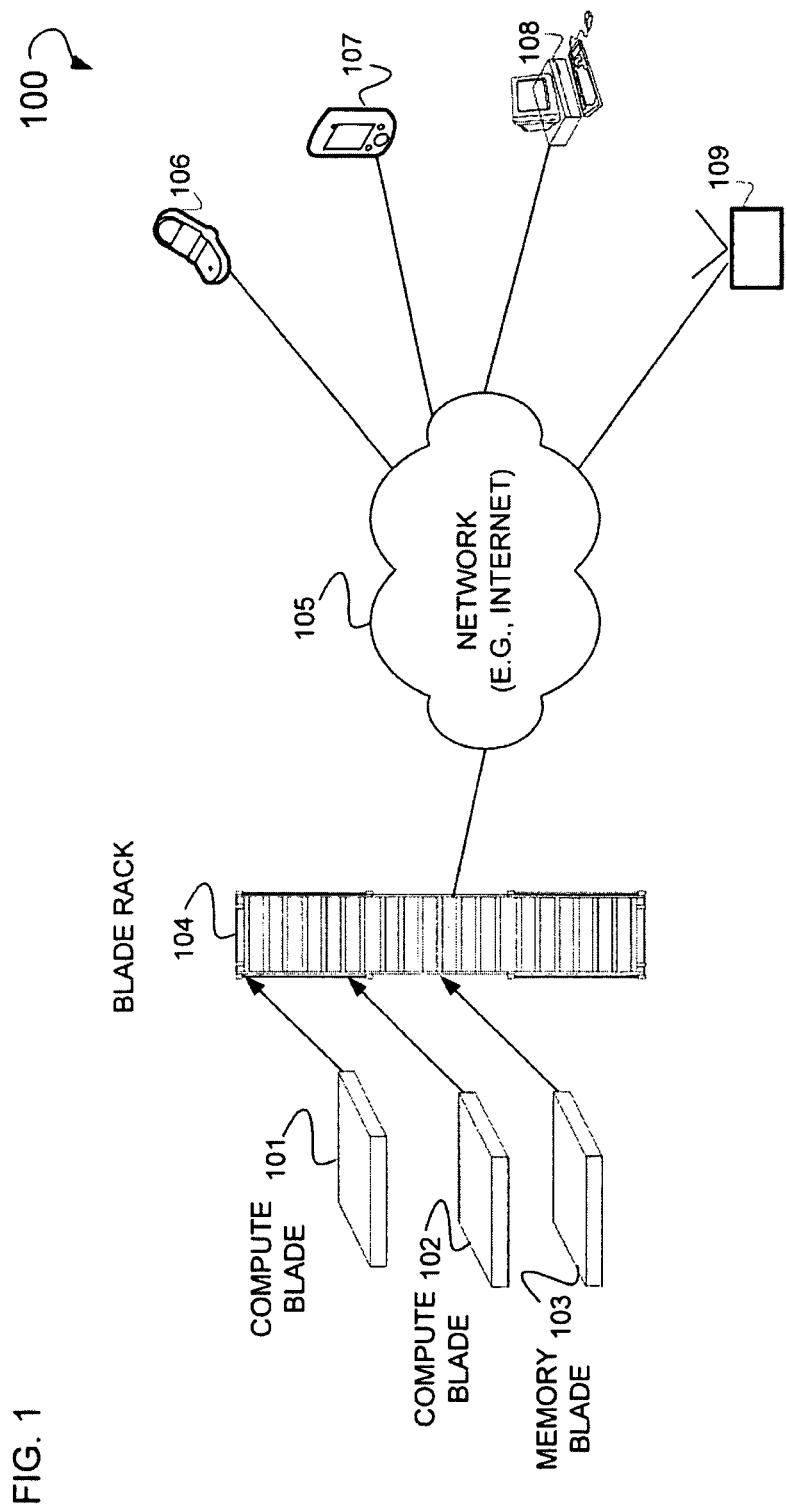
FIG. 1 is a diagram of a system, according to an example embodiment, illustrating virtual page based memory disaggregation using a hypervisor-based implementation of a compute blade.

Illustrated is a system and method for DMA and super page optimization for page swapping based memory disaggregation. In some example embodiments, a system and method is illustrated that allows an I/O driver to be aware of whether a local or remote virtual memory page is being accessed during the course of performing DMA operation. This awareness allows the I/O driver to optimize certain DMA operations. Additionally, the system and method illustrated herein allows for various types of lazy page swapping (e.g., migration) between local and remotely located virtual memory pages. A local virtual memory page may reside on a compute blade, whereas a remote virtual memory page may reside on a memory blade. This lazy swapping involves the use of super virtual memory pages, referred to herein as super pages, which are made up of sub pages. Further, the system and method shown herein also utilizes a super page vector, as a part of a hypervisor managing the I/O driver, to identify these super pages and sub pages.

In some example embodiments, a system and method is illustrated that allows an I/O driver to be aware of whether a local or remote virtual memory page is being accessed during the course of performing DMA operations. An I/O driver includes, for example, a video driver, printer driver, or some other suitable I/O driver that facilitates the transfer of data to or from a computer system such as a compute blade. A local virtual memory page is a page of virtual memory that is native to a particular compute blade. A remote virtual memory page is page of virtual memory that is remotely located relative to the compute blade. Example DMA operations include a flush remote virtual memory page to disk operation, or a load block from disk into remote memory operation. These operations will be more fully discussed below.

Some example embodiments include the system and method illustrated herein that allows for various types of lazy page swapping (e.g., migration) between locally and remotely located virtual memory pages. As shown herein local and remote virtual memory pages may be super pages or sub pages. An example super page is a virtual memory page in excess of 2 MB in size, whereas an example sub page is 4 KB in size. Super pages are aggregates of sub pages with contiguous addresses. In some example embodiments, a super page or a sub page is referenced using a Machine Address (MA). Lazy swapping includes the swapping of sub pages on an as needed basis, whereby rather than swapping an entire local super page for an entire remote super page, only the necessary sub pages are swapped. As needed, as used herein, includes a sub page by sub page basis. Necessary, as used herein, includes as are required for the execution of a specific memory command. As discussed below, there are three types of lazy swapping that include: on-demand swapping for the first access to a remote super page, ECC based on demand swapping for subsequent access to other sub pages the super page, and local-local swapping where remote swapping has been denied.

In some example embodiments, the system and method shown herein also utilizes a super page vector, as a part of a hypervisor, to identify these super pages and sub pages. A super page vector is a data structure such as an array that resides upon and is managed by a hypervisor. The super-page vector may include entries in the form of the page type bit flag values for each super page frame. Additionally, this super page vector may include entries in the form of referents (e.g., pointers) to page table entries in a virtual memory page table (e.g., mappings to) managed by the hypervisor. In some example embodiments, the page table is managed by an operating system. A page table is a data structure such as a tree or hash table that tracks virtual memory pages, their physical locations and virtual memory properties utilized by a compute blade and/or memory blade. As will be more fully discussed below, in some example embodiments the super page vector is used to determine whether a requested local or remote virtual memory page is a super page or sub page. Through making this determination one of the above referenced types of lazy swapping may be implemented.

A hypervisor, or Virtual Machine Monitor (VMM), is computer software/hardware platform virtualization software that allows multiple operating systems (OSs) to run transparently on a host computer concurrently. These multiple operating systems, also referred to herein as Virtual Machines (VMs), may be implemented using any one of a number of virtualization schemes. These schemes include Full Virtualization, Hardware-Assisted Virtualization, Partial Virtualization, Paravirtualization, and Operating System-Level Virtualization. A computer blade, as referenced herein, is a computer system with memory to read input commands and data, and a processor to perform commands manipulating that data. A memory blade is a device used to manage memory separately from compute blades, and includes memory controllers, buffers, and memory modules.

FIG. 1 is a diagram of an example system 100 illustrating virtual page swapping based memory disaggregation using a hypervisor-based implementation of a compute blade. Shown are a compute blade 101, a compute blade 102, and a memory blade 103 each of which is positioned proximate to a blade rack 104. The compute blades 101-102 are operatively connected to the network 105 via a logical or physical connection. The network 105 may be an internet, an intranet, a Wide Area Network (WAN), a Local Area Network (LAN), or some other network and suitable topology associated with the network. In some example embodiments, operatively connected to the network 105 is a plurality of devices including a cell phone 106, a Personal Digital Assistant (PDA) 107, a computer system 108 and a television or monitor 109. In some example embodiments, the compute blades 101-102 communicate with the plurality of devices via the network 105.

Figure 2:
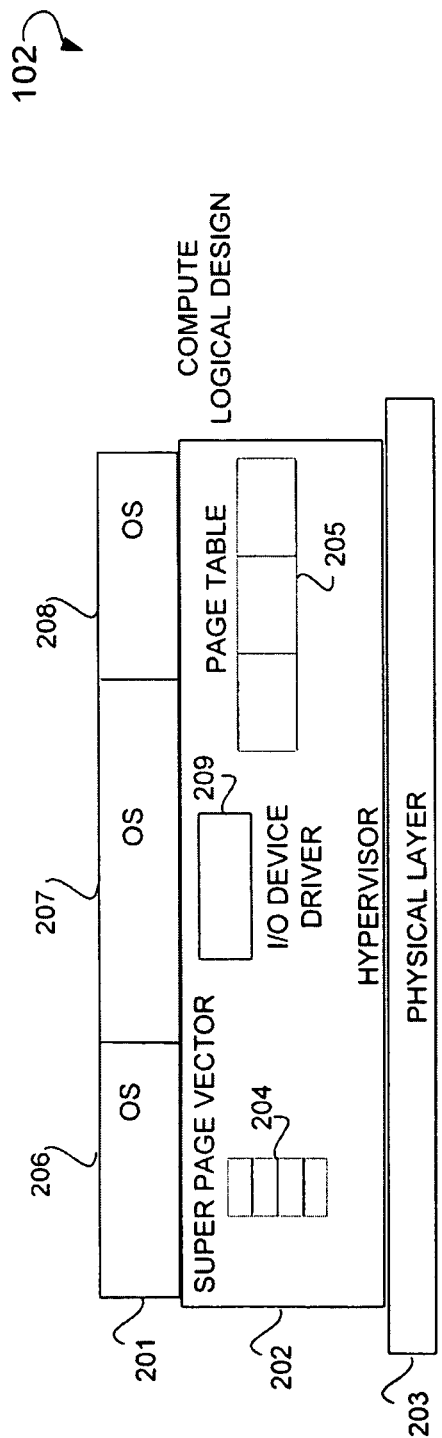
FIG. 2 is a diagram illustrating a logical design of the compute blade, according to an example embodiment, used in DMA and super page migration optimizations for page-swapping based memory disaggregation.

FIG. 2 is a diagram illustrating an example logical design of the compute blade 102 used in DMA and super page optimizations for page-swapping based memory disaggregation. Shown is a logical design of the compute blade 102 and the various logical layers associated therewith. Illustrated is an operating system layer 201 that resides upon a hypervisor 202, which, in turn, resides upon a physical layer 203. The operating system layer 201 includes one or more operating systems acting as VMs. Suitable operating systems include for example the LINUX™ operating system, Microsoft Corporation's WINDOWS™ operating system, Sun Corporation's SOLARIS™ operating system, the UNIX™ operating system, or some other suitable operating system known in the art. In some example embodiments, the operating system layer 201 includes operating systems 206 through 208. The hypervisor 202 may be configured as a Type 1, Type 2, or Hybrid-Type hypervisor. An example hypervisor 202 includes the XEN™ hypervisor. The physical layer is a computer system such as a compute blade.

In some example embodiments, included as part of the hypervisor 202 is a super page vector 204, and a page table 205. The super page vector 204 is a data structure such as an array, tree or other suitable data structure, that includes page type bit flags representing the page type (e.g., super page or sub page) for each virtual page stored in the page table 205. The page type bit flag may be a boolean value, integer, or some other suitable value. In one example embodiment, a page type bit flag is retrieved from an MA through applying bit shifting to the MA. The page type bit flag is used to determine the page type of a virtual memory page (e.g., "1" for a super page, and "0" for a sub page). This page type can be determined in constant time (e.g., O(1)) in lieu of traversing the page table 205 to make such a determination which can often take logarithmic time (e.g., O(log n)).

Some example embodiments include an I/O device driver 209 that is included as part of the hypervisor 202. The I/O device driver 209 can be implemented as part of a special VM that communicates with the hypervisor to support the DMA optimizations illustrated below. An example of a special VM is the domain0 associated with the implementation of the XEN™ hypervisor. This I/O device driver 209 may implement a DMA method that allows the I/O device driver 209 to be aware of whether it is utilizing local or remote memory pages such that unnecessary copying can be avoided. This DMA method(s) is outlined below.

Figure 3:
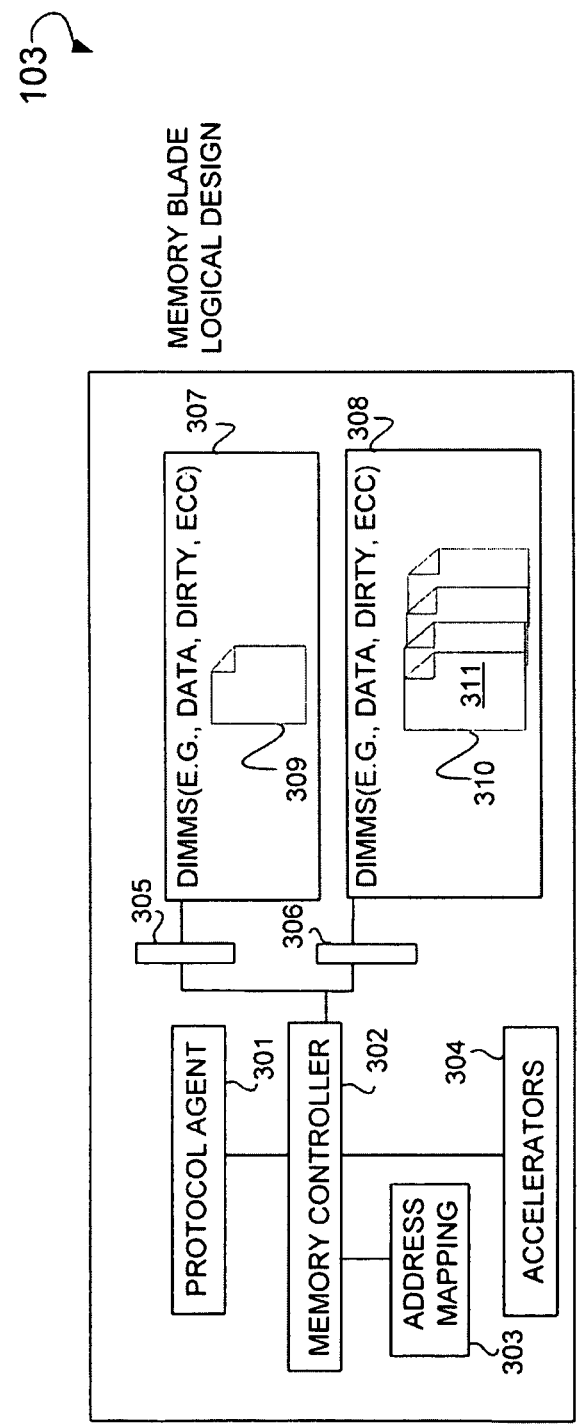
FIG. 3 is a diagram of a memory blade logical design, according to an example embodiment, illustrating the various logic modules that are included in the memory blade.

FIG. 3 is a diagram of an example memory blade logical design 103 illustrating the various logic modules that are included in the memory blade 103. Shown is a protocol agent 301 that communicates with the compute blades (e.g., compute blades 101 and 102). This communication may be via some type of protocol including Peripheral Component Interconnect Express (PCIe), HyperTransport™, or some other suitable protocol. Further, this communication includes the packing/unpacking of requests and responses using the aforementioned protocols. Requests that cannot be satisfied directly by the memory blade are forwarded to other memory blades or compute blades. A requested forwarded to other memory blades is referenced herein as a memory-side request. A memory controller 302 is illustrated that handles read or write requests. In some example embodiments, these read and write requests are data pairs that include a bladeID, and a compute blade machine address (e.g., the SMA). An address mapping module 303 is implemented to check whether the read and write requests have the appropriate permissions. Where the appropriate permission exists, a requested access is permitted and a Remote Memory Address (RMMA) is retrieved by the address mapping module 303. The RMMA is forwarded by the memory controller 302 to a corresponding repeater buffer (e.g., buffer) 305 and 306 via a memory channel. The buffers 305 or 306 respond to this request through performing the necessary encoding and decoding operation for the memory modules 307 and 308 upon which the target data is located. These memory modules 307 and 308 may be Dual In-Line Memory Modules (DIMMS). Residing on the memory module 307 may be a sub page 309, while residing on the memory module 308 may be a super page 310 that includes a sub page 311. An accelerator module 304 is illustrated that can be implemented either within the memory controller 302, or within repeater buffers 305 and 306 to do special purpose computation on the data. This accelerator can be a CPU, Application-Specific Integrated Circuit (ASIC), or a Field-Programmable Gate Array (FPGA). Special purpose computation includes the execution of hashing algorithms (e.g., the Secure Hashing Algorithm (SHA)), compression/decompression algorithms, encryption/decryption algorithms (e.g., the Advanced Encryption Standard (AES)), or ECC/chip kill coding. The buffers may be implemented to hide the density/timing/control details of a memory module from the central memory controller. Further, a buffer may be used to independently operate other buffers in the case of the failure of another buffer.

FIG. 4 is a diagram of an example system 400 illustrating the swapping of a remote memory page in the form of a sub page or super page. Illustrated is the compute blade 102 that is operatively coupled to the memory blade 103 via a communication channel 401. The communication channel 401 may be a logical or physical connection. In example cases where the communication channel 401 is a physical connection it may be copper or optical fiber based. The communication channel 401 may be routed through a backplane 402 to connect the computer blade 102 and the memory blade 103. As illustrated, the memory blade 103 transmits a virtual memory page (e.g., a sub page) 309 across the communication channel 401 to the compute blade 102. This transmission is referenced at 404 as a swapping of a remote super page. In some example embodiments, the virtual memory page 309 may be a super page or a sub page. The virtual memory page 309 is used to overwrite a victim page selected by the hypervisor 202 residing on the computer blade 102. Here, for example, virtual memory page 403, a local memory page, has been selected as a victim page. In some example embodiments, a temporary page, is use to store the data of the victim page (e.g., virtual memory page 403).

FIG. 5 is a diagram of an example system 500 that is used to implement lazy swapping of a remote sub page or super page. Shown are the compute blade 102 and the memory blade 103 that are connected via the communication channel 401. Also shown is a super page 310 that resides upon the memory blade 103. The super page 310 may be stored in the memory modules 307 or 308. Further, illustrated is a sub page 311 that is a part of the super page 310. In one example embodiment, the sub page 311 is transmitted across a communication channel 401 to the compute blade 102. This transmission may be in the form of a lazy swapping reference herein at 501. A lazy swapping, as used herein, is a transmission of a requested virtual memory page on an as needed basis such that the super page that the sub page is associated with need not be transmitted in its entirety. Various types of methods for implementing lazy swapping are outlined below.

Figure 6:
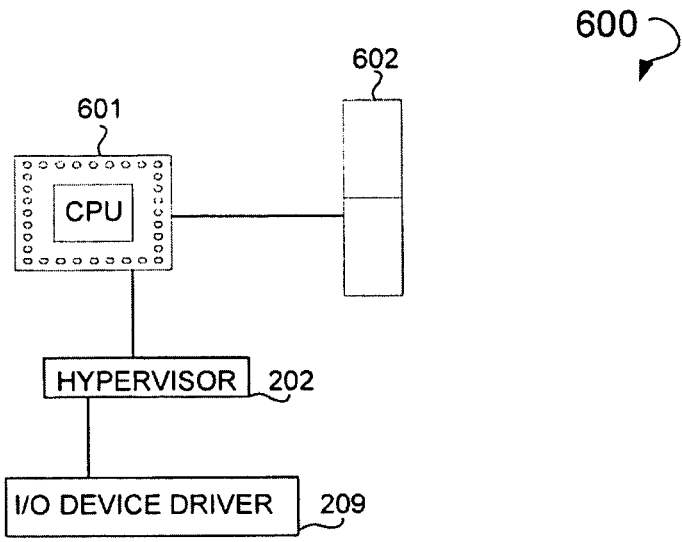
FIG. 6 is a block diagram of a computer system, according to an example embodiment, in the form of a compute blade used to facilitate DMA access by an Input/Output (I/O) driver module.

FIG. 6 is a block diagram of an example computer system in the form of the compute blade 102 used to facilitate DMA access by an I/O driver module. These various blocks may be implemented in hardware, firmware, or software as part of the computer blade 101, or computer blade 102. Further, these various blocks are operatively connected via logical or physical connections. Additionally, a CPU 601 is used to execute and manage the various modules referenced herein. This CPU 601 is operatively connected to a memory module 602. Illustrated is a hypervisor 202 that is executed to identify an I/O driver module such as the I/O device driver 209 to receive a read or write command to read or write a virtual memory page from a remote memory location. As used herein, a driver is a module. As shown, the hypervisor 202 is operatively connected to the CPU 601, whereas the I/O device driver 209 is operatively connected to the hypervisor 202. An I/O device driver 209 is shown that reads the remote virtual memory page into a memory buffer allocated to and managed by the I/O device driver 209. The storage of these virtual memory pages is executed through the use of the I/O device driver 209, The hypervisor 202 is also executed to identify the I/O device driver 209 to receive a write command to write a further virtual memory page to the memory buffer managed by the I/O device driver 209. The I/O device driver 209 is also executed to copy the further virtual memory page to the remote memory location. In some example embodiments, the I/O device driver 209 is capable of at least one of DMA, or Remote Direct Memory Access (RDMA). Additionally, the remote memory location is accessed across a network such as network 105. The I/O device driver 209 is also executed to identify the virtual memory page, the identification based upon page size information associated with the virtual memory page. The hypervisor 202 is also executed to de-allocate the remote memory location to free the remote memory location.

Figure 7:
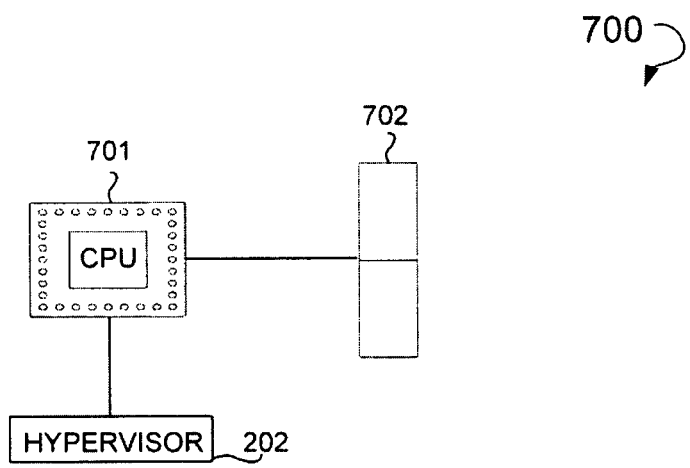
FIG. 7 is a block diagram of a computer system, according to an example embodiment, in the form of the compute blade used to identify a virtual page type with a page type bit value.

FIG. 7 is a block diagram of an example computer system in the form of the compute blade 102 used to identify a virtual page type with a page type bit value. These various blocks may be implemented in hardware, firmware, or software as part of the computer blade 101, or computer blade 102. Further, these various blocks are logically or physically connected. Additionally, a CPU 701 may be used to execute and manage the various modules referenced herein. Memory 702 is also used in conjunction with the CPU 701. Illustrated is the hypervisor 202 that is executed to identify an address of a virtual memory page, the Machine Address (MA) of the virtual memory page including the address bits used to index the super page vector for retrieving the page type bit flag value of this virtual memory page. The hypervisor 202 is also executed to apply an operation to the address of the virtual memory page, to retrieve the page type bit flag value. Further, the hypervisor 202 also is executed to identify a page type based upon the page type bit flag value. The hypervisor 202 is also executed to map a super page vector entry (see e.g., super page vector 204), that includes the page type bit flag value, to the page table 205. In some example cases, the super page vector entry includes an entry for the virtual memory page that further includes the page type bit flag value. The address of the virtual memory page may include at least one of an MA, or a VMA. In some example embodiments, the page type includes at least one of a super page, or a sub page. Additionally, the operation includes at least one of a bit shifting operation. The hypervisor 202 may also be executed to update a page table entry to reflect a change in the page type bit flag value. Further, the hypervisor 202 may also be used to update a super page vector entry to reflect the change in the page type bit flag value. In some example embodiments, the change in the page type bit flag value reflects a change in the page type.

Figure 8:
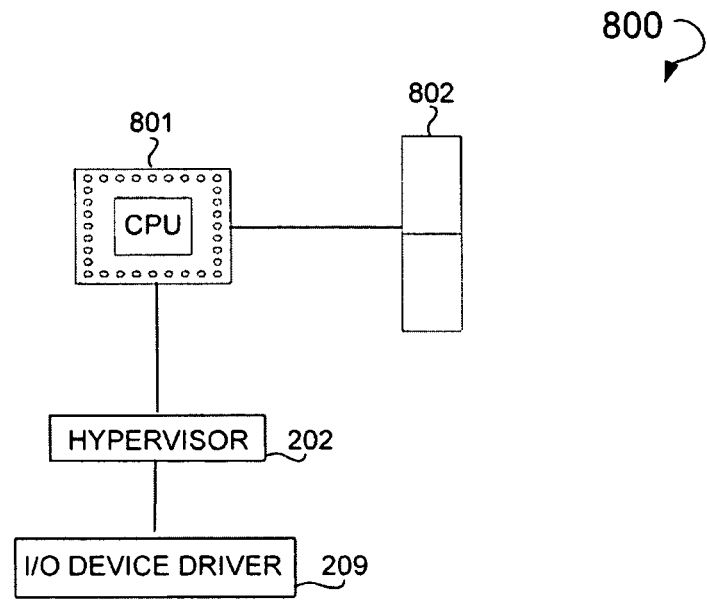
FIG. 8 is a block diagram of a computer system, according to an example embodiment, in the form of the compute blade used to execute the lazy swapping of virtual memory pages.

FIG. 8 is a block diagram of an example computer system in the form of the compute blade 102 used to execute the lazy swapping of virtual memory pages. These various blocks may be implemented in hardware, firmware, or software as part of the computer blade 101, or computer blade 102. Further, these various blocks are logically or physically connected. Additionally, a CPU 801 may be used to execute and manage the various modules referenced herein. A memory 802 is shown that is operatively connected to the CPU 801. As used herein, a driver is a module. As shown, the hypervisor 202 is operatively connected to the CPU 801, whereas the I/O device driver 209 is operatively connected to the hypervisor 202. Illustrated is an I/O device driver such as the I/O device driver 209 that is executed to identify a remote super page, the remote super page including a remote sub page. Additionally, the I/O device driver 209 is executed to identify a local super page, the local super page including a local sub page. Further, the I/O device driver 209 is executed to swap the local sub page for the remote sub page, the swapping occurring over a network such as network 105. In some example embodiments, the hypervisor 202 is executed to allocate at least one virtual memory page as the local super page. Further, the swapping may include transmission over a network. The I/O device driver 209 is executed to detect an ECC for the remote sub page. In some example embodiments, the swapping includes transmitting the remote sub page over the network 105, where the ECC code is detected for the remote sub page. The I/O device driver 209 may be executed to detect an FCC for the remote sub page. Moreover, the I/O device driver 209 is executed to swap the local sub page with a further local sub page, the further local sub page including a mask virtual memory address. In some example embodiments, the mask virtual memory address is a virtual memory address for the remote sub page.

Figure 9:
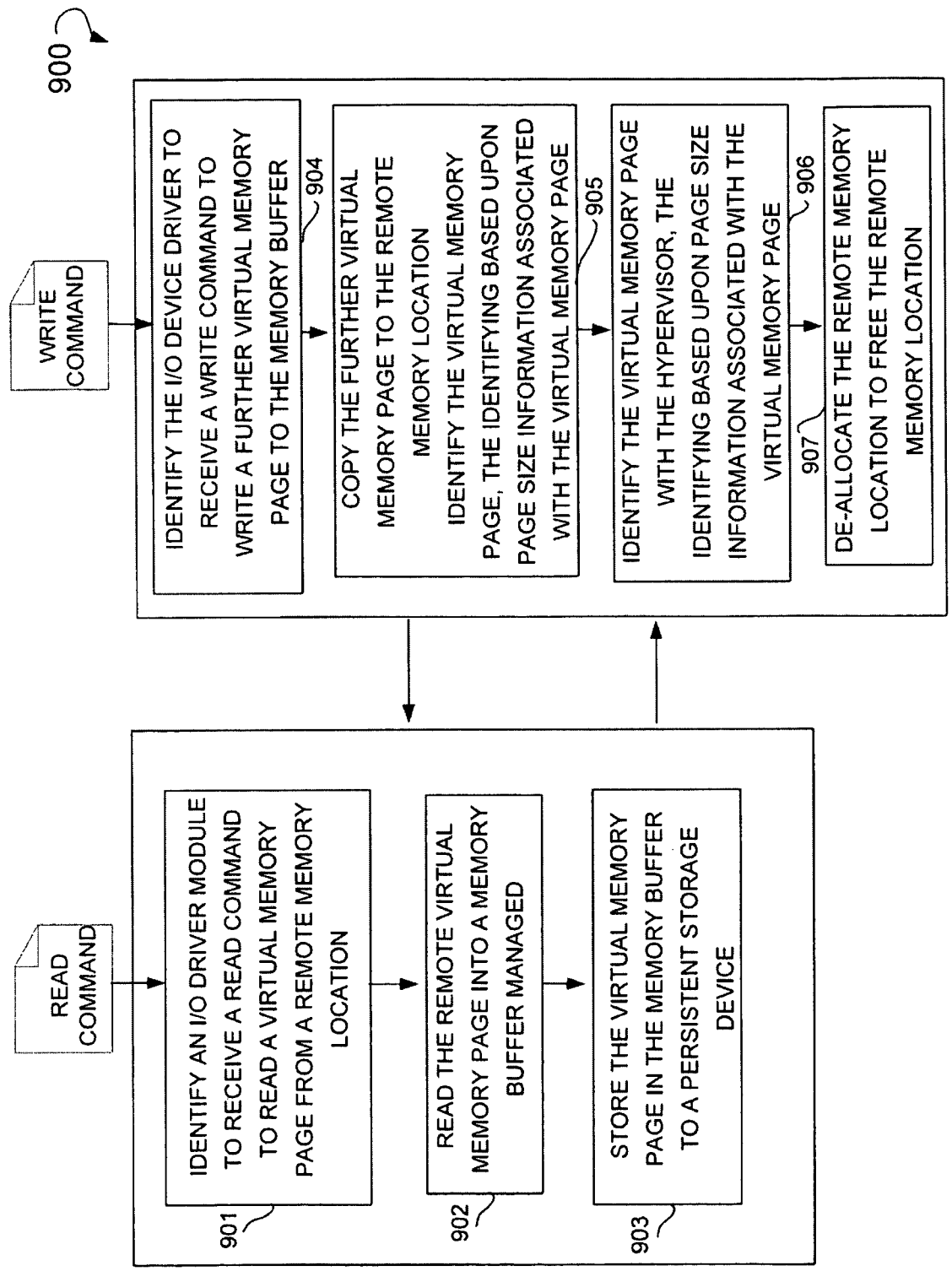
FIG. 9 is a flow chart illustrating a method, according to an example embodiment, executed to allow for DMA by an I/O device driver.

FIG. 9 is a flow chart illustrating an example method 900 executed to allow for DMA by an I/O device driver. Shown are various operations that are executed by a computer system such as the compute blade 101 or compute blade 102. An operation 901 is executed by the hypervisor 202 to identify an I/O driver module to receive a read command to read a virtual memory page from a remote memory location. Operation 902 is executed by the I/O device driver 209 to read the remote virtual memory page into a memory buffer managed by the I/O device driver 209. Operation 903 is executed by the I/O device driver 209 to store the virtual memory page in the memory buffer to a persistent storage device. Operation 904 is executed by the hypervisor 202 to identify the I/O device driver 209 to receive a write command to write a further virtual memory page to the memory buffer managed by the I/O driver module. Operation 905 is executed by the I/O device driver 209 to copy the further virtual memory page to the remote memory location. In some example embodiments, the I/O driver module is a module capable of at least one of DMA, or RDMA. Some example embodiments include the remote memory location is accessed across a network. Operation 906 is executed by the I/O device driver 209 to identify the virtual memory page, the identifying based upon page size information associated with the virtual memory page. Operation 907 is executed by the hypervisor 202 to de-allocate the remote memory location to free the remote memory location.

Figure 10:
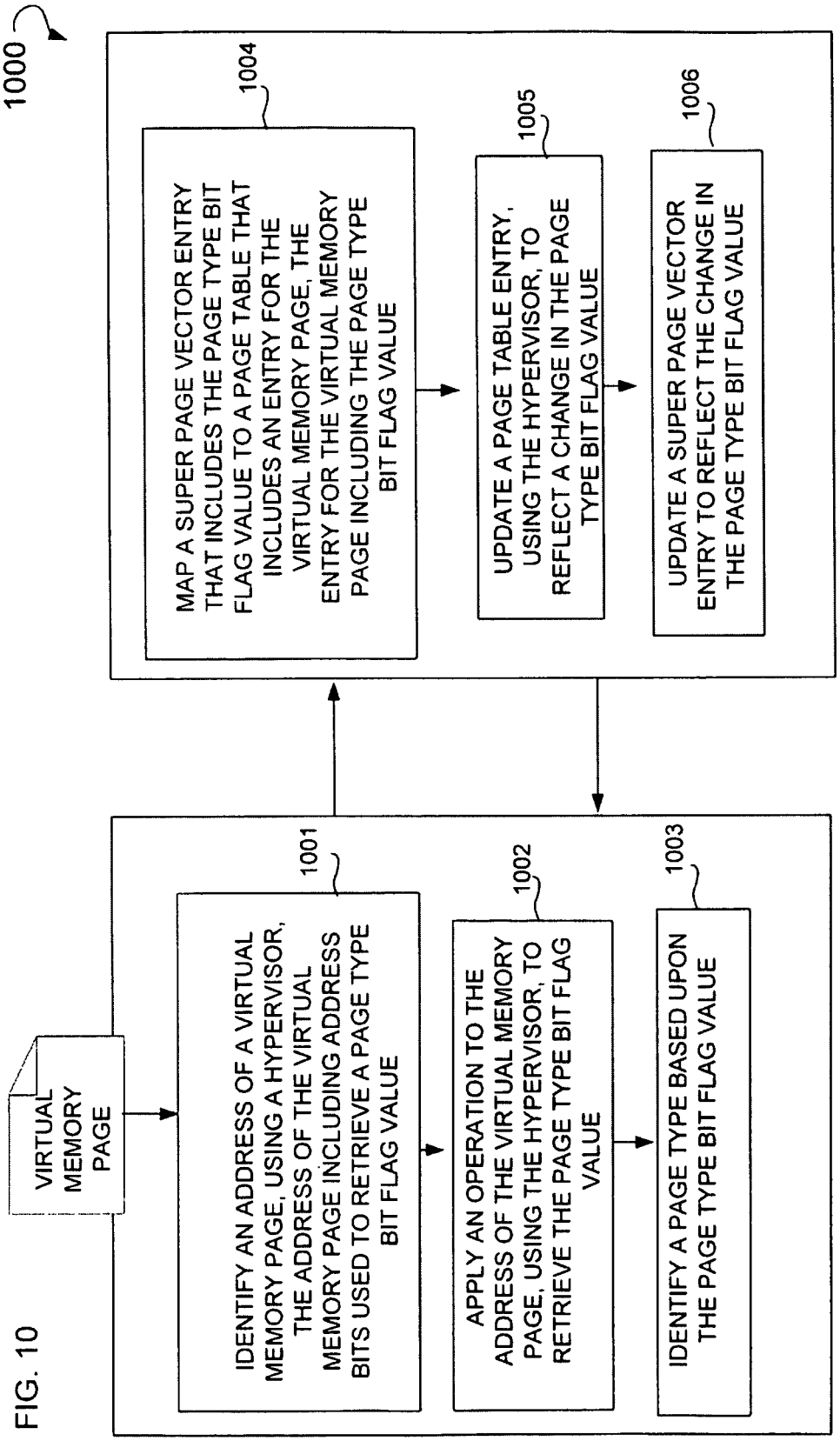
FIG. 10 is a flow chart illustrating an example method 1000 executed to identify and maintain a virtual page type with a page type bit value.

FIG. 10 is a flow chart illustrating an example method 1000 executed to identify a virtual page type with a page type bit value. The method 1000 may be executed by the compute blade 101 or compute blade 102. An operation 1001 is executed by the hypervisor 202 to identify the machine address (MA) of the virtual memory page including the address bits used to index the super page vector for retrieving the page type bit flag value of this virtual memory page. An operation 1002 is executed by the hypervisor 202 to apply an operation to the address of the virtual memory page, using the hypervisor, to index into the super page vector and retrieve the page type bit flag value. Operation 1003 is executed by the hypervisor 202 to identify a page type based upon the page type bit flag value. Operation 1004 is executed by the hypervisor 202 to map a super page vector entry that includes the page type bit flag value to a page table that includes an entry for the virtual memory page, the entry for the virtual memory page including the page type bit flag value. In some example embodiments, the address of the virtual memory page includes at least one of an MA, or a VMA. Some example embodiments include the page type that includes at least one of a super page, or a sub page. The operation includes at least one of a bit shifting operation. An operation 1005 is executed by the hypervisor 202 to update a page table entry, when needed, using the hypervisor, to reflect a change in the page type bit flag value. Operation 1006 is executed by the hypervisor 202 to update a super page vector entry to reflect the change in the page type bit flag value. In some example embodiments, the change in the page type bit flag value reflects a change in the page type.

Figure 11:
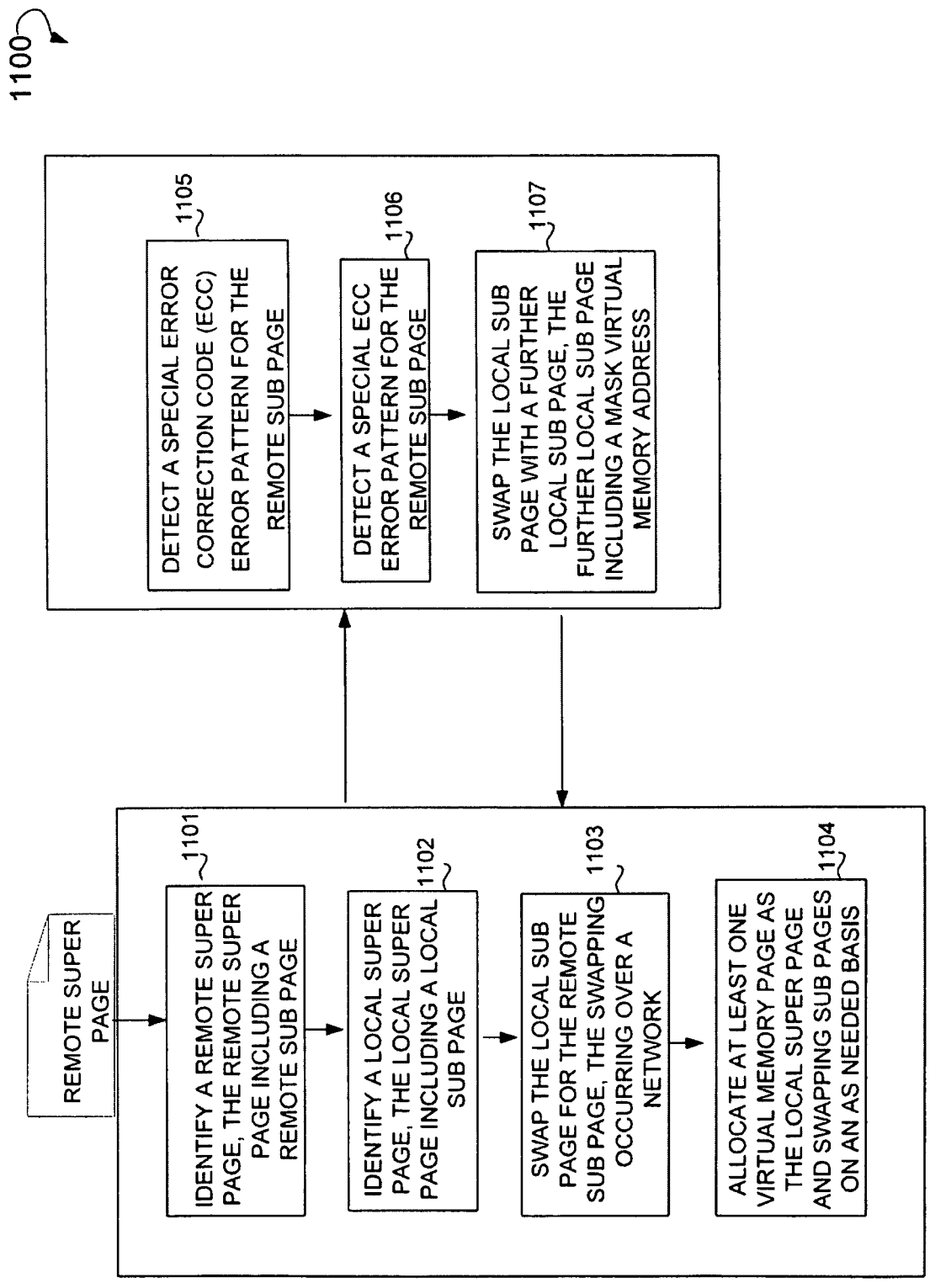
FIG. 11 is a flow chart illustrating a method, according to an example embodiment, used to execute the lazy swapping of virtual memory super pages.

FIG. 11 is a flow chart illustrating an example method 1100 used to execute the lazy swapping of virtual memory pages. This method 1100 may be executed by the compute blade 101 or compute blade 102. Operation 1101 is executed by the hypervisor 202 to identify a remote super page, the remote super page including a remote sub page. Operation 1102 is executed by the hypervisor 202 to identify a local super page frame, the local super page frame including a local sub page. Operation 1103 is executed by the hypervisor 202 to swap the local sub page frame for the remote sub page, the swapping occurring over a network. Operation 1104 is executed by the hypervisor 202 to allocate at least one virtual memory page as the local super page, and swapping sub pages on an as needed basis. In some example embodiments, the swapping includes transmission over a network such as network 105. Operation 1105 is executed by the hypervisor 202 to detect a special ECC error pattern for the remote sub page. As used herein, a special ECC error pattern is a unique bit pattern. In some example embodiments, the swapping includes transmitting the remote sub page over a network, where the special ECC error pattern is checked for the remote sub page. Operation 1106 is executed by the hypervisor 202 to detect a special ECC error pattern for the remote sub page. In some example embodiments, the ECC error pattern is detected for the remote sub page to trigger further sub page swapping. Operation 1107 is executed by the hypervisor 202 to swap the local sub page with a further local sub page, the further local sub page including a mask virtual memory address. In some example embodiments, the mask virtual memory address is a virtual memory address for the remote sub page.

Figure 12:
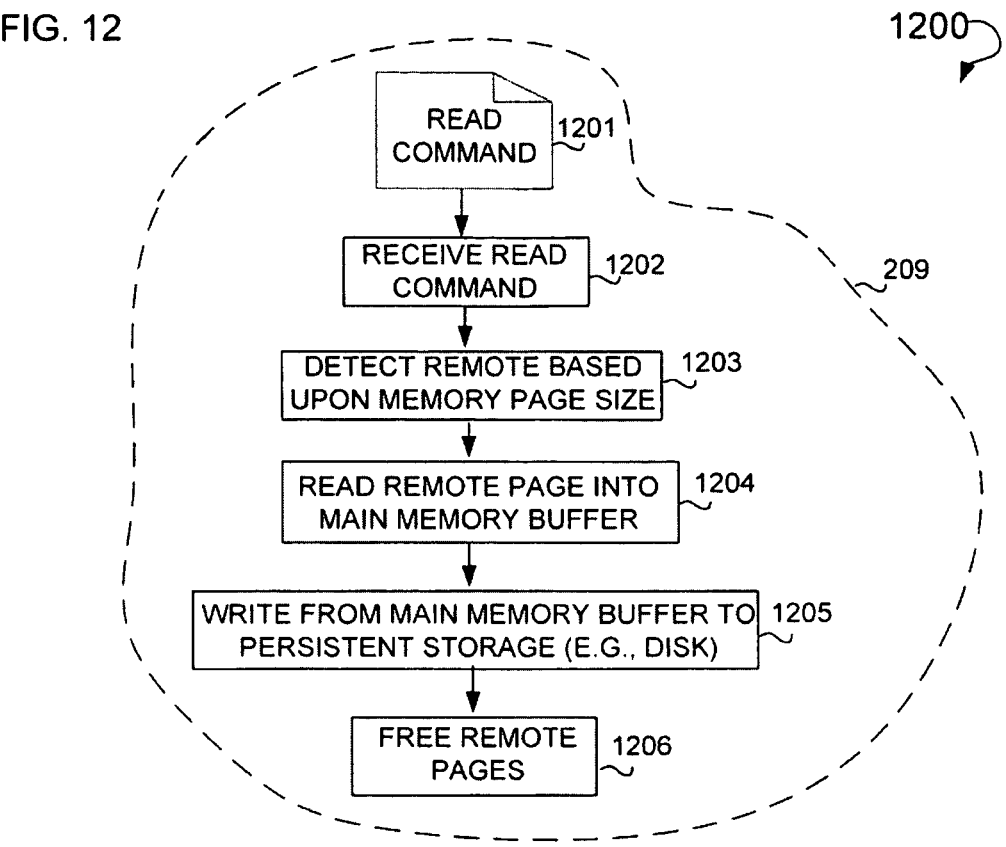
FIG. 12 is a flow chart illustrating a method, according to an example embodiment, for using an I/O device driver to copy a remote memory page to an I/O device as a DMA operation.

FIG. 12 is a flowchart illustrating an example method 1200 for using an I/O device driver to copy a remote memory page to an I/O device as a DMA operation. Illustrated are various operations 1202 through 1206 that are executed by the I/O device driver 209. An operation 1202 is executed to receive a read command 1201. Operation 1203 is executed to detect whether the requested memory page is remotely located relative to the computer blade 102. An operation 1204 is executed that reads the remote page into the main memory buffer for the compute blade 102. This remote page may be for example, the sub page 311. Operation 1205 is executed to write data from the main memory buffer to persistent storage (e.g., a disk). An operation 1206 is executed that frees remote pages for later use by the compute blade 102.

Figure 13:
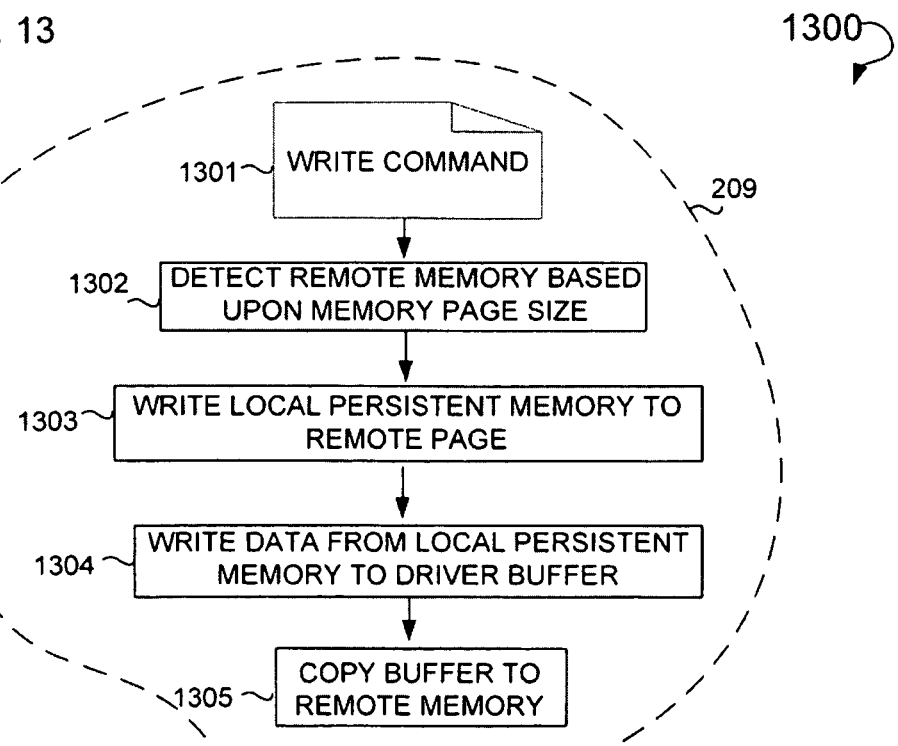
FIG. 13 is a flowchart illustrating a method, according to an example embodiment, for using an I/O driver to load a block of memory from persistent storage into remote memory as a type of DMA.

FIG. 13 is a flowchart illustrating an example method 1300 for using an I/O driver to load a block of memory from an I/O device into remote memory as a type of DMA. Shown are various operations 1302 through 1305 that are executed via the I/O device driver 209. Operation 1302 is executed to detect whether the requested memory page is remotely located relative to the computer blade 102. Operation 1303 is executed to write the local persistent memory to a remote page. Operation 1304 is executed to write data from a local persistent memory to a driver buffer. Operation 1305 is executed to copy the driver buffer to remote memory.

Figure 14:
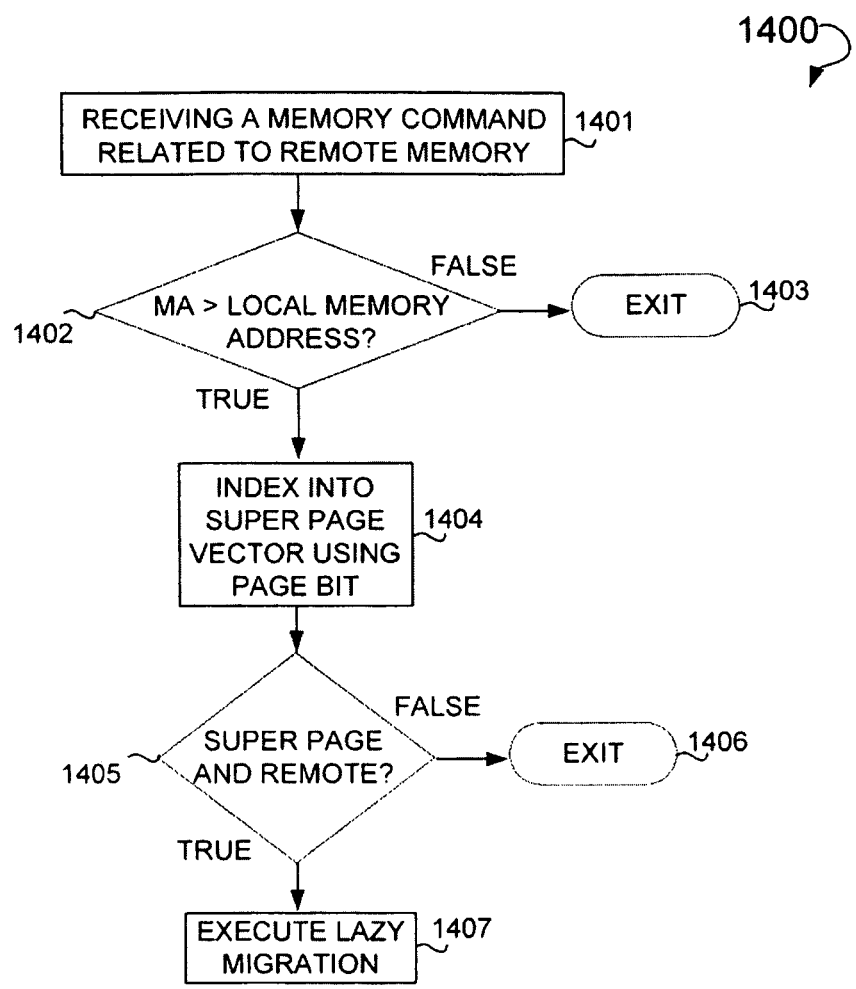
FIG. 14 is a flowchart illustrating the execution of a method, according to an example embodiment, to facilitate memory access for lazy migration.

FIG. 14 is a flowchart illustrating the execution of an example method 1400 to facilitate memory access for lazy migration. Shown is an operation 1401 that is executed to receive a remote memory command. A decisional operation 1402 is shown that determines whether an MA referenced in the remote memory command is greater than (>) a local memory address. In cases where decisional operation 1402 evaluates to "false," a termination condition. 1403 is executed. In cases where decisional operation 1402 evaluates to "true," an operation. 1404 is executed. Operation 1404, when executed, facilitates an indexing into the super page vector 204. This indexing is performed through applying, for example, a modulo or bit shifting operation to a MA and use the result to retrieve a bit that denotes a type of page (e.g., a page type bit flag) from the super page vector. A decisional operation 1405 is executed to determine whether a virtual memory page is a super page and is remotely located. In cases where this decisional operation 1405 evaluates to "false," a termination condition 1406 is executed. In cases where decisional operation 1405 evaluates to "true," an operation 1407 is executed. Operation 1407, when executed, implements some type of lazy swapping. Examples of lazy swapping will be more fully illustrated below.

Figure 15:
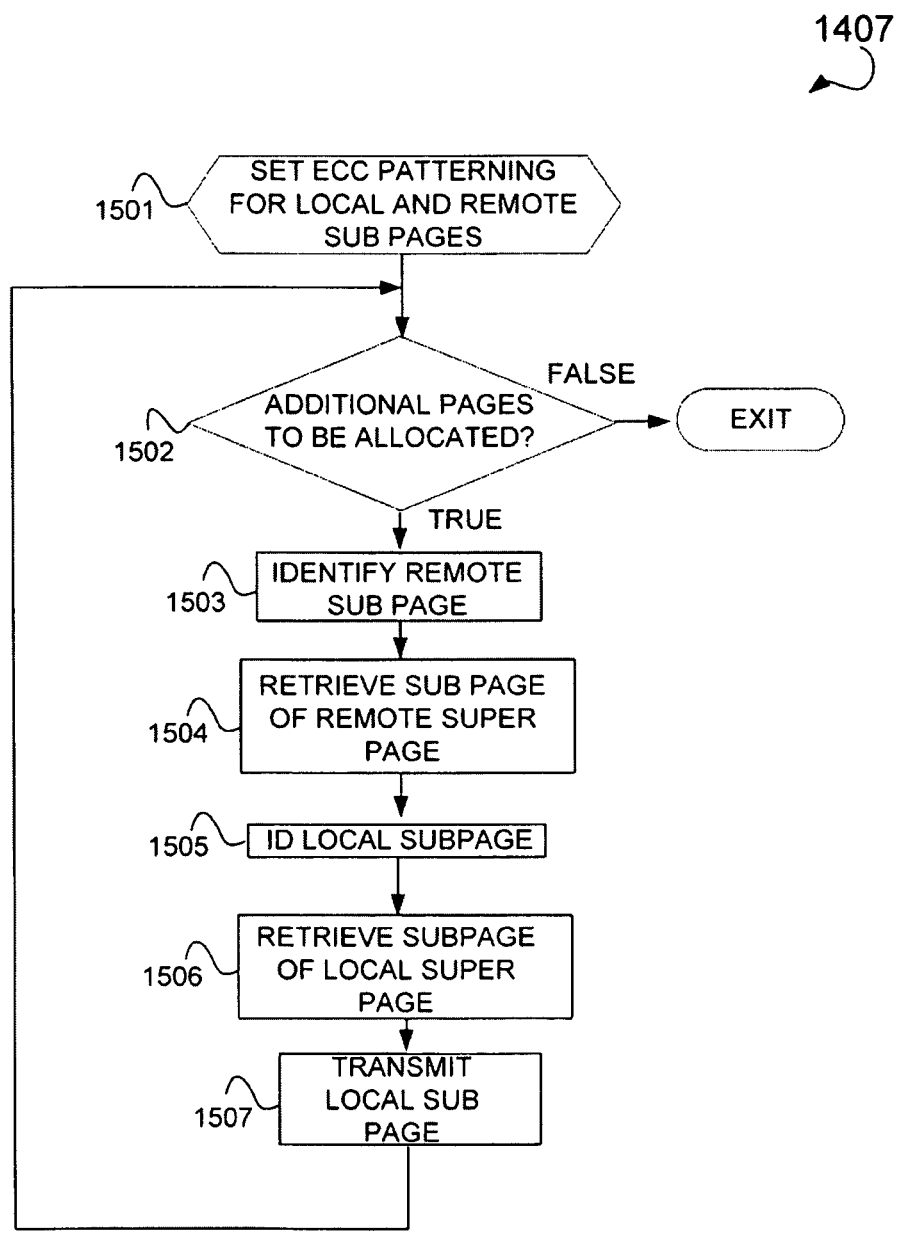
FIG. 15 is a flowchart illustrating a method, according to an example embodiment, in the form of on-demand lazy swapping.

FIG. 15 is a flowchart illustrating an example method 1407 in the form of on-demand swapping. Shown is a process 1501 that executes to set a special ECC error pattern for local and remotes sub pages. A decisional operation 1502 is shown that determines whether additional pages are to be allocated. Additional pages include additional virtual memory pages in the form of sub pages and/or super pages. In cases where decisional operation 1502 evaluates to "false" a termination condition is executed. In cases where decisional operation 1502 evaluates to "true," an operation 1503 is executed to identify the remote sub page. This remote sub page may be the sub page 311. Operation 1504 is executed to retrieve the sub page of a remote super page. Super page 310 is an example of a super page with which sub page 311 is associated. An operation 1505 is executed to identify a local sub page. An operation 1506 is executed to retrieve a sub page of a local super page. An operation 1507 is executed to transmit a local sub page.

Figure 16:
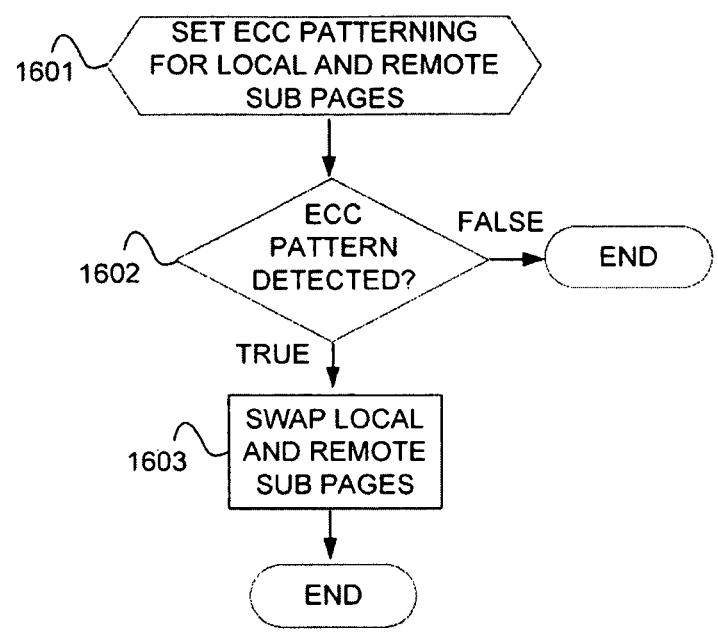
FIG. 16 is a flowchart illustrating the execution of an operation, according to an example embodiment, in the form of a subsequent lazy swap implementation.

FIG. 16 is a flowchart illustrating the execution of an example operation 1407 in the form of a subsequent lazy swap implementation. In some example embodiments, the subsequent lazy swap implementation utilizes ECC-based on demand swapping. Shown is a process 1601 to check ECC patterning for local and remote sub pages. A decisional operation 1602 is shown that determines whether the ECC error matches the special pattern denoting a sub page to be swapped on-demand. In cases where decisional operation 1602 evaluates to "false," a termination condition is executed. In cases where decisional Operation 1602 evaluates to "true," an operation 1603 is executed. The operation 1603, when executed, swaps a local sub page with a remote sub page and uses normal ECC code to denote the sub page has been properly swapped.

Figure 17:
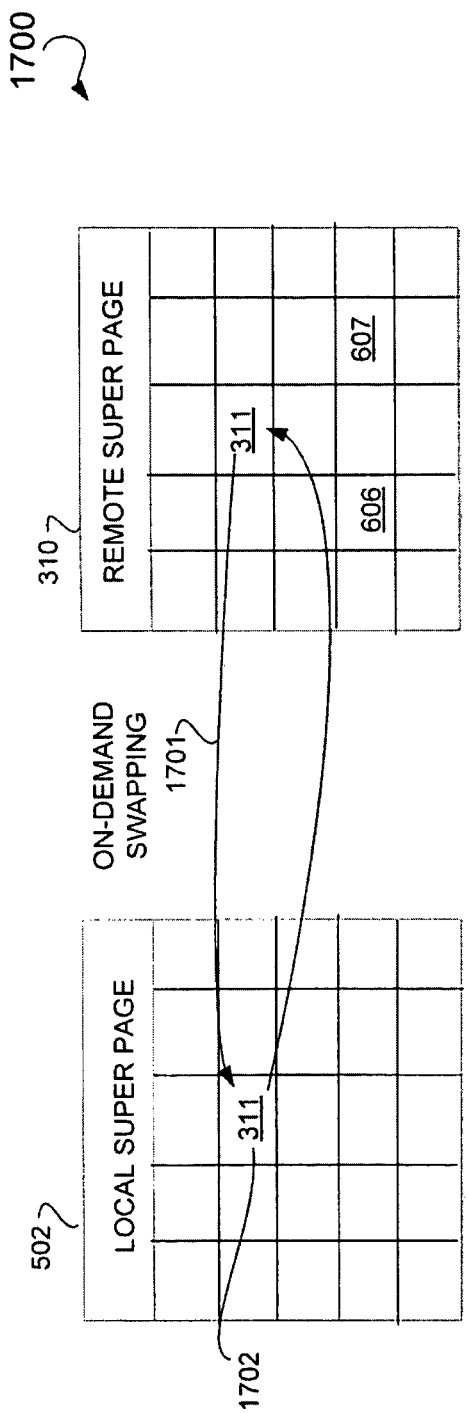
FIG. 17 is a diagram of a schema, according to an example embodiment, illustrating on-demand swapping.

FIG. 17 is a diagram of an example schema 1700 illustrating on-demand swapping. Shown are the local super page 502, and the remote super page 310. Residing as a part of super page 502 is a plurality of sub pages. Further, residing as a part of the super page 310 is a plurality of sub pages including the Sub page 311, sub page 606, and sub page 607. In some example embodiments, on-demand swapping is implemented whereby only sub page 311 is swapped with a sub page residing as a part of the super page 502. This sub page residing within the super page 502 is referenced herein at 1702.

Figure 18:
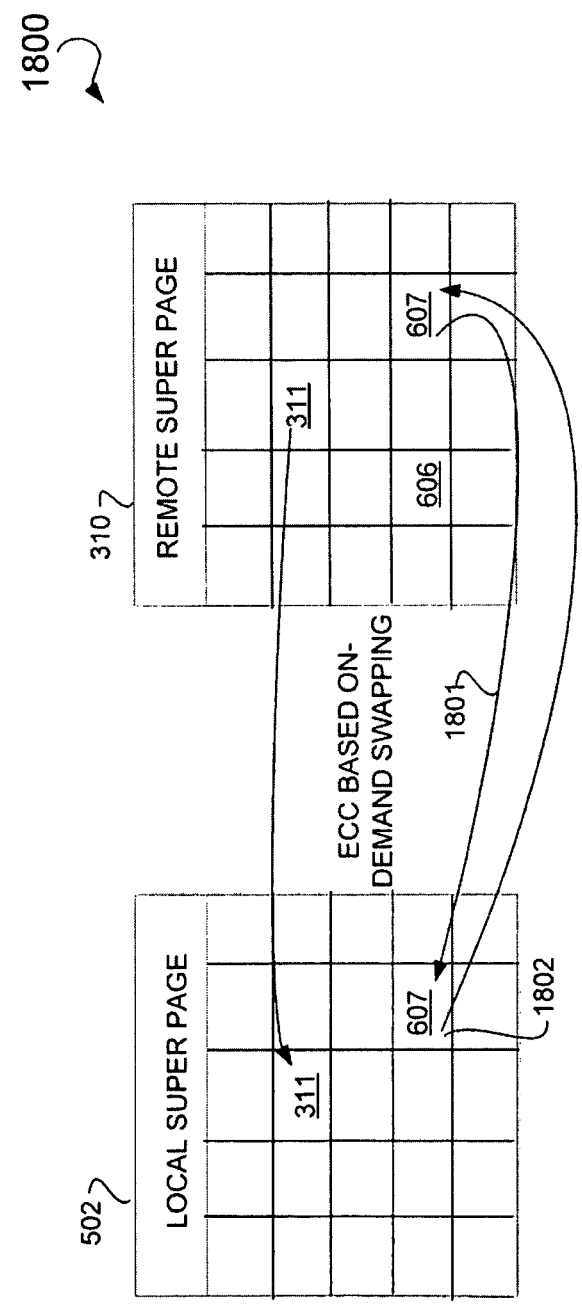
FIG. 18 is a diagram of a schema, according to an example embodiment, illustrating Error Correction Code (ECC)-based on-demand lazy swapping.

FIG. 18 is a diagram of an example schema 1800 illustrating FCC-based on-demand swapping. Shown are the super pages 502 and 310. In some example embodiments, ECC coding is set for certain remotely located in sub pages. Where this ECC coding is set, these sub pages may not be available for swapping. In certain cases, however, where the ECC coding has not been set for a particular sub page, this sub page may be available for swapping. In some example embodiments, ECC coding includes the setting of a special bit pattern, the ECC code associated with a sub page within a memory module. As illustrated herein, the accessing of the sub page 607 on either the local super page or the remote super page triggers an ECC error due to their special ECC coding, and triggers the sub page swapping between local and remote sub pages in an on-demand manner.

Figure 19:
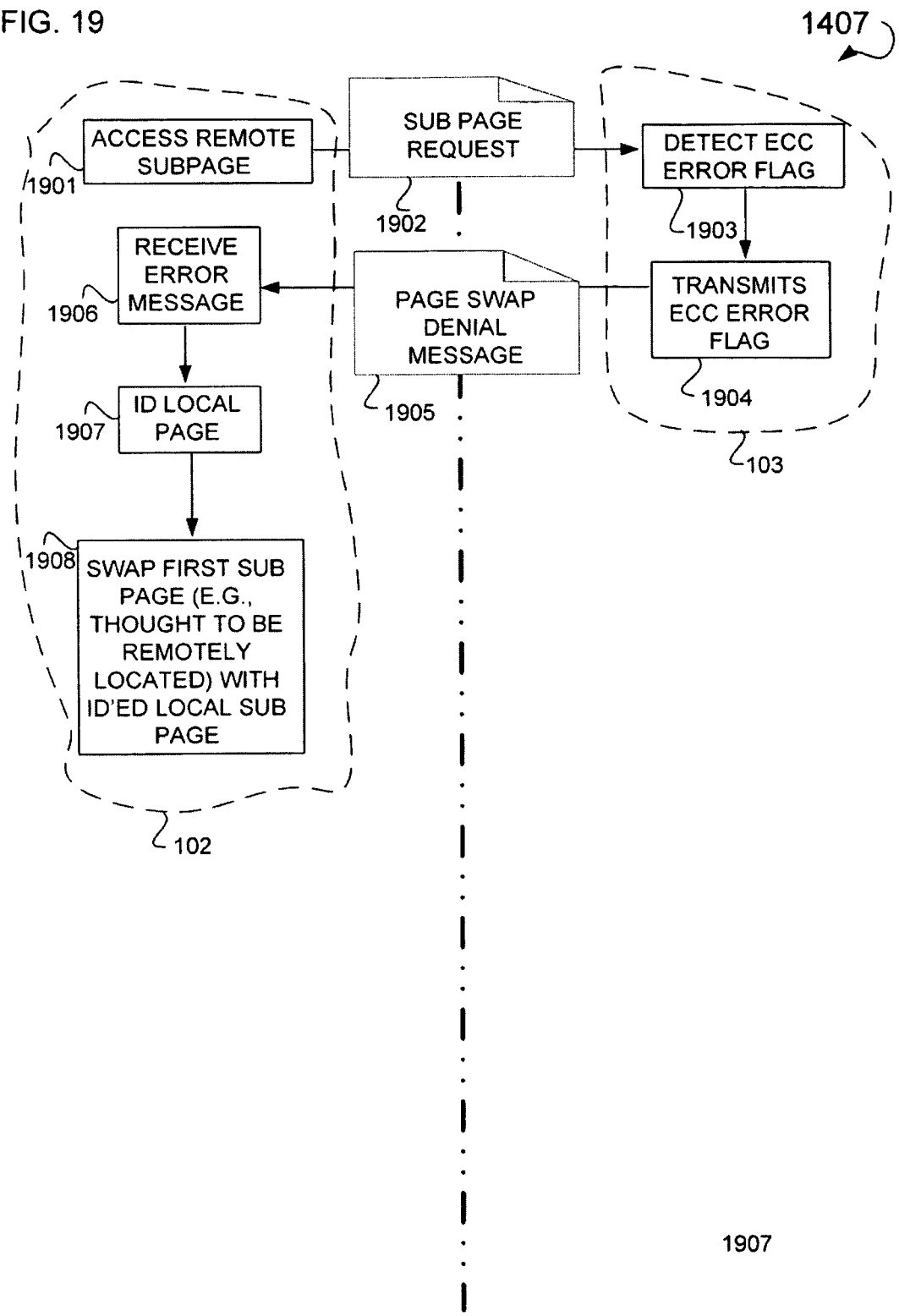
FIG. 19 is a dual-stream flow chart illustrating the execution of an operation, according to an example embodiment, showing local-local swapping where remote swapping has been denied.

FIG. 19 is a dual-stream flow chart illustrating the example execution of operation 1407 showing local-local swapping where remote swapping has been denied. This happens when the sub page is supposedly stored remotely, but is actually still locally stored since it has not been swapped due to lazy swapping optimization. In order to properly access this sub page, it needs to be swapped with another local page. Illustrated are various operations 1901, and 1906 to 1908 that are executed by the compute blade 102, Further, shown are operations 1903 and 1904 that may be executed by the memory blade 103. An operation 1901 is executed to access a remote sub page by sending a sub page request 1902 from the compute blade 102 to the memory blade 103. This sub page request may be sent along the communication channel 401. An operation 1903 is executed to detect the existence of a special ECC error pattern. In cases where the ECC error pattern has been detected, an operation 1904 is executed. Operation 1904, when executed, transmits a page swap denial message 1905 along the communication channel 401 to the compute blade 102. An operation 1906 is executed that receives the page swap denial message 1905. Au operation 1907 is executed that identifies a local sub page that can be used in lieu of the remote sub page for which the ECC error pattern has been set. This local sub page may be identified and selected based upon whether it is free, its size, or other suitable criteria. An operation 1908 is executed to swap a first sub page with the identified local sub page. In some example embodiments, sub page aliasing will be implemented such that a VM accessing the identified local sub page may use a MA associated with the remote local sub page, but which is mapped to the identified local sub page.

Figure 20:
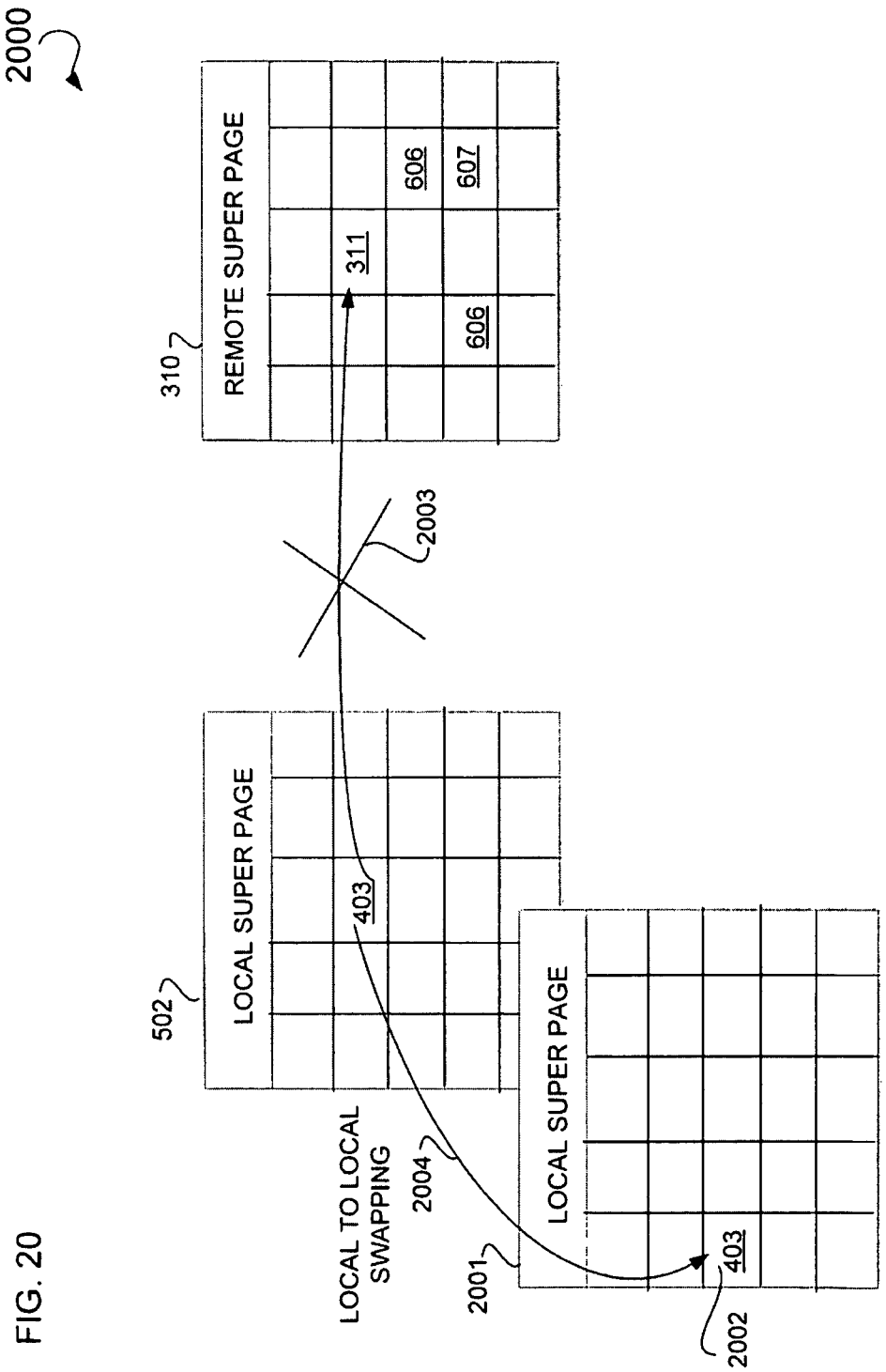
FIG. 20 is a diagram of a schema, according to an example embodiment, illustrating local-local swapping remote swapping, where remote swapping has been denied.

FIG. 20 is a diagram of an example schema 2000 illustrating local-local swapping where remote swapping is denied. Shown are the local super pages 502 and 2001, Further shown is the remote super page 310. Associated with the local super page 502 is a sub page 403, Additionally, associated with the local super page 2001 is an additional sub page referenced at 2002. In some example embodiments, a local to remote swap is attempted between the sub page 403 and the sub page 311. In cases where an ECC error pattern is set, this local to remote swap may be denied. In such a scenario, a local-local swap between the local sub page 403 and the local sub page represented at 2002 may be implemented. This local-local swapping may implement sub page aliasing as illustrated above.

Figure 21:
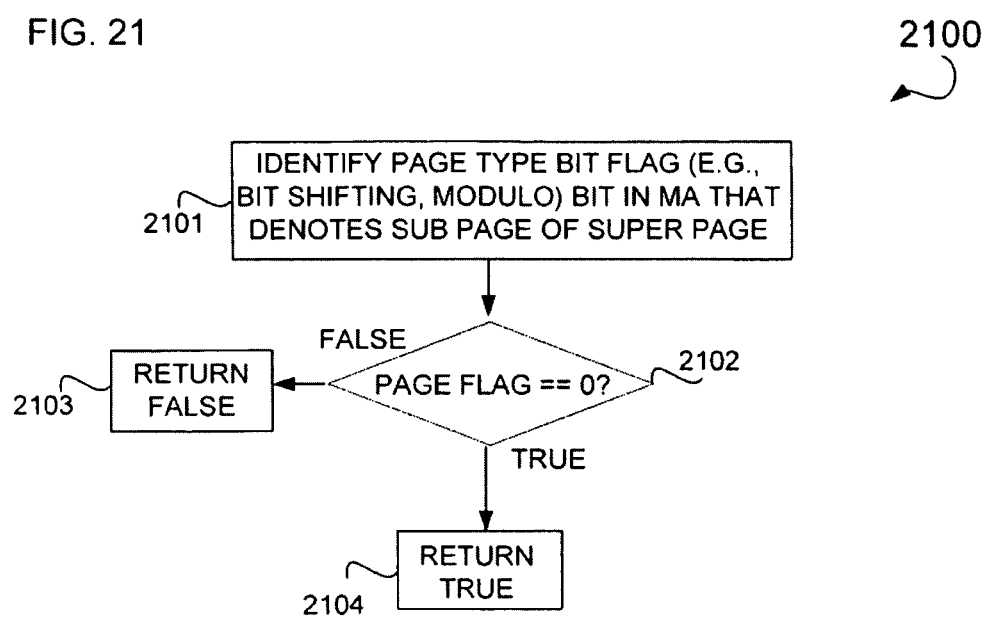
FIG. 21 is a flowchart illustrating a method, according to an example embodiment, executed by a hypervisor to determine whether or not a requested page is a super page.

FIG. 21 is a flowchart illustrating an example method 2100 executed by the hypervisor 202 to determine whether or not a requested page is a super page. Shown is an operation 2101 that is executed to identify a page type bit flag in an MA. In some example embodiments, the operation 2101 may implement a bit shifting operation. A decisional operation 2102 is executed that determines whether the page type bit flag is set to denote the existence of a sub page. In cases where the decisional operation 2102 evaluates to "false," an operation 2103 is executed to return a false value. In cases where decisional operation 2102 evaluates to "true" an operation 2104 is executed to return a true value. In some example embodiments, where the page flag value is set to "1," as determined by operation 2102, a "true" value is returned by the operation 2104.

Figure 22:
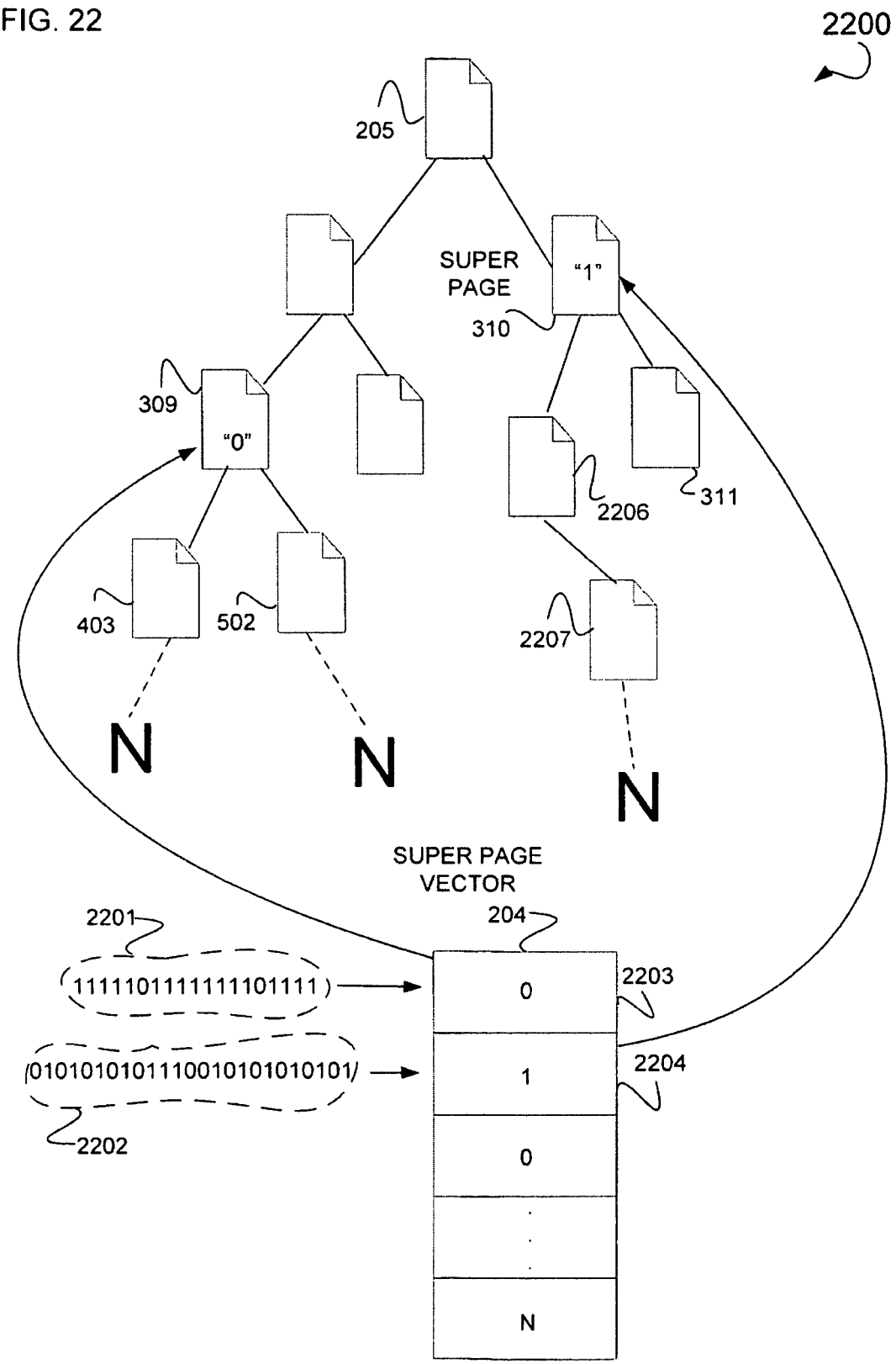
FIG. 22 is a diagram of a schema, according to an example embodiment, illustrating the relationship between a super page and a page table for the purpose of identifying a sub page or super page.

FIG. 22 is a diagram of an example schema 2200 illustrating the relationship between super page 204 and the page table 205 for the purpose of identifying a sub page or super page. Illustrated is the page table 205 represented here in at root node of a tree. Also shown as part of this tree, is a node representing the sub page 309, a node representing the super page 310, a node representing the sub page 311, a node representing the sub page 403, and a node representing the super page 502. Also shown are nodes representing a sub page 2206, and a sub page 2207. As illustrated, an MA 2201 has a module operation or bit shifting operation applied to it to retrieve a particular bit value, Here, for example, the MA 2201 returns a bit value of "0" denoting that sub page 309 is a sub page. The MA 2202 has a modulo or bit shifting operation applied to it to return a bit value of "1" denoting that super page 310 is a super page. The hit values returned from each of the above referenced operation applied to the MAs 2201 and 2202 are reflected in the super page vector entries 2203 and 2204. In some example embodiments, the super page vector entries 2203 and 2204 include a referent (e.g., a pointer) to the page table 205 and the entries included therein.

Figure 23:
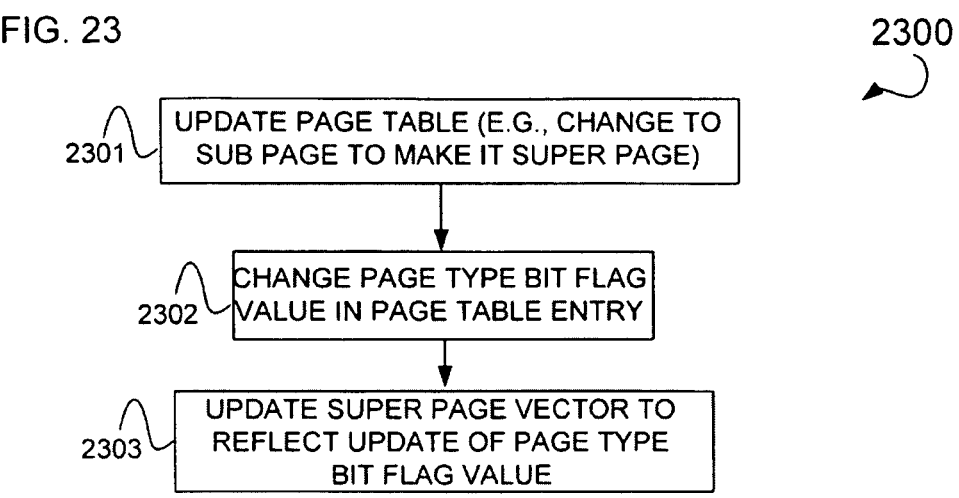
FIG. 23 is a flowchart illustrating the execution of a method, according to an example embodiment, used to update a super page vector, where changes to a page table occur.

FIG. 23 is a flowchart illustrating the execution of an example method 2300 used to update a super page vector, where changes to a page table occur. Various operations 2301 through 2303 are illustrated that may be executed by the hypervisor 202. Operation 2301 is executed to update a page table 205 such that a sub page becomes a super page or vice-versa. Operation 2302 is executed to change a page type bit value flag in a page table entry (e.g., page table entry 2203 and 2204) to reflect the change from sub page to super page or vice versa. The page table entry may be a field (e.g., a bit field) in the page table 205 used to denote whether the virtual memory page is a sub page or super page. An operation 2303 is executed to update the super page vector 204 to reflect the update of the page table 205. In one example embodiment, a referent to the changed entry in the page table 205 is allocated to denote that the entry is now a super page or sub page.

Figure 24:
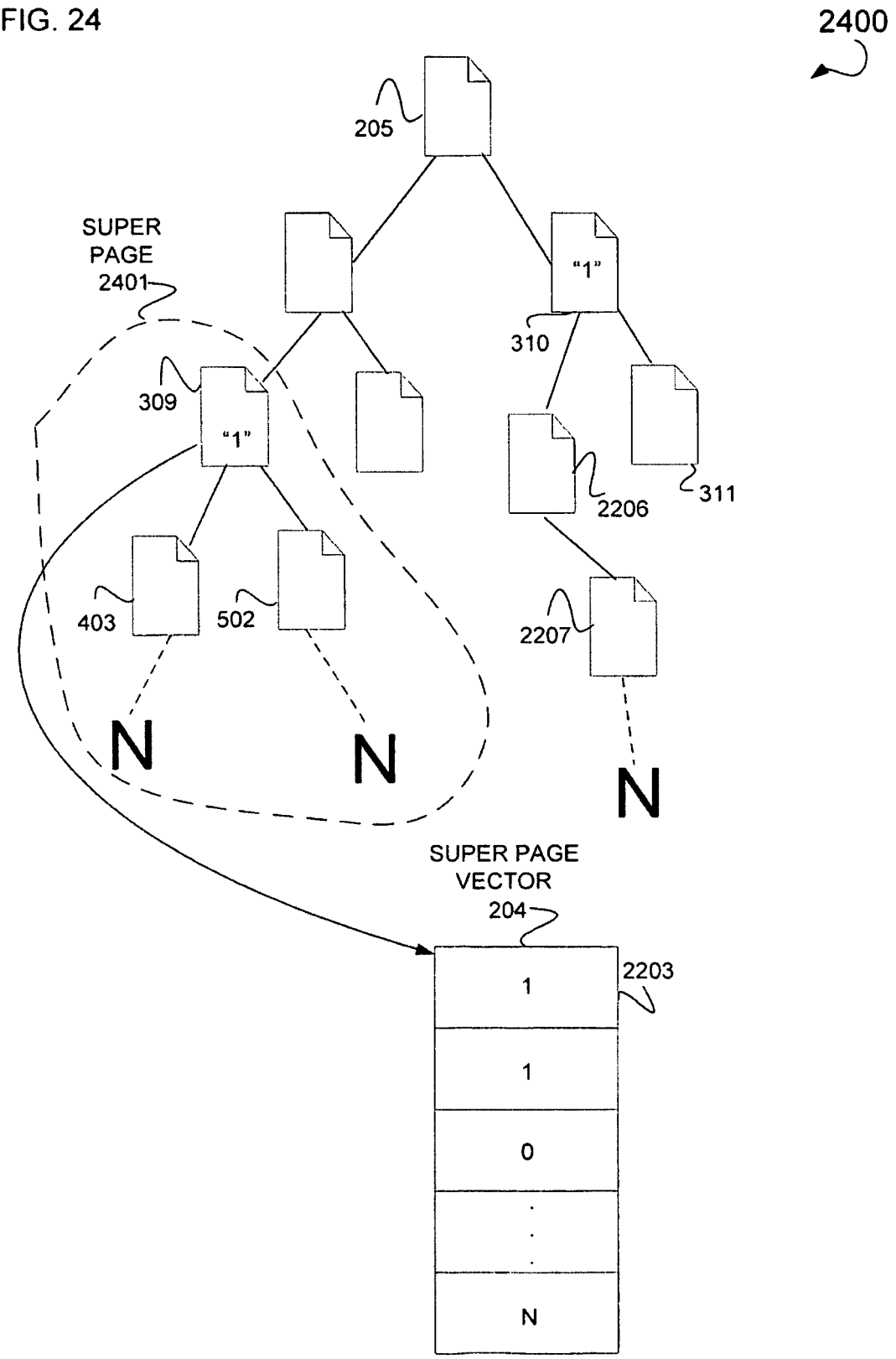
FIG. 24 is a diagram of a schema, according to an example embodiment, showing the updating of a page table and a corresponding updating of the super page vector.

FIG. 24 is a diagram of an example schema 2400 showing the updating of a page table and a corresponding updating of the super page vector. Shown is the super page vector 204, where the super page vector entry 2203 is changed from being a "0" to a "1." This change is based upon a change to the page table entry referenced at 2401 whereby the sub page 309 becomes a super page. This change of the sub page 309 becoming a super page is illustrated by the page type bit flag field in the page table entry for the sub page 309 being changed from a "0" to a "1."

Figure 25:
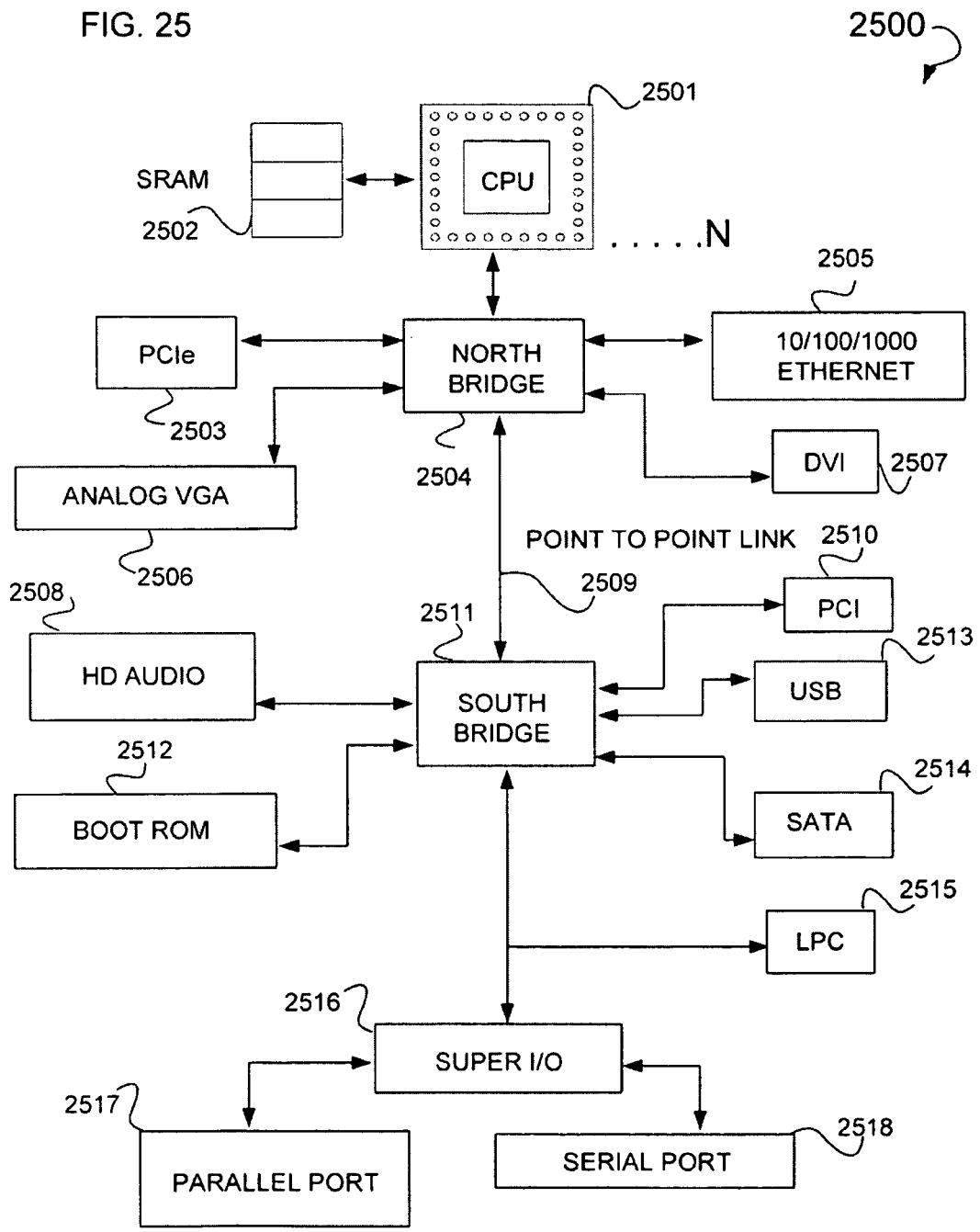
FIG. 25 shows a diagrammatic representation of a machine in the example form of a computer system within which a set of instructions for causing the machine to perform any one or more of the methodologies discussed herein may be executed.

FIG. 25 is a diagram of an example computer system 2500. Shown is a CPU 2501. The processor die 201 may be a CPU 2501. In some example embodiments, a plurality of CPU may be implemented on the computer system 2500 in the form of a plurality of cores (e.g., a multi-core computer system), or in some other suitable configuration. Some example CPUs include the x86 series CPU. Operatively connected to the CPU 2501 is Static Random. Access Memory (SRAM) 2502. Operatively connected includes a physical or logical connection such as, for example, a point to point connection, an optical connection, a bus connection or some other suitable connection. A North Bridge 2504 is shown, also known as a Memory Controller Hub (MCH), or an Integrated Memory Controller (IMC), that handles communication between the CPU and PCIe, Dynamic Random Access Memory (DRAM), and the South Bridge. A PCIe port 2503 is shown that provides a computer expansion port for connection to graphics cards and associated GPUs. An ethernet port 2505 is shown that is operatively connected to the North Bridge 2504. A Digital Visual Interface (DVI) port 2507 is shown that is operatively connected to the North Bridge 2504. Additionally, an analog Video Graphics Array (VGA) port 2506 is shown that is operatively connected to the North Bridge 2504. Connecting the North Bridge 2504 and the South Bridge 2511 is a point to point link 2509. In some example embodiments, the point to point link 2509 is replaced with one of the above referenced physical or logical connections. A South Bridge 2511, also known as an I/O Controller Hub (ICH) or a Platform Controller Hub (PCH), is also illustrated. Operatively connected to the South Bridge 2511 are a High Definition (HD) audio port 2508, boot RAM port 2512, PCI port 2510. Universal Serial Bus (USB) port 2513, a port for a Serial Advanced Technology Attachment (SATA) 2514, and a port for a Low Pin Count (LCP) bus 2515. Operatively connected to the South Bridge 2511 is a Super Input/Output (I/O) controller 2516 to provide an interface for low-bandwidth devices (e.g., keyboard, mouse, serial pods, parallel ports, disk controllers), Operatively connected to the Super I/O controller 2516 is a parallel port 2517, and a serial port 2518.

The SATA port 2514 may interface with a persistent storage medium (e.g., an optical storage devices, or magnetic storage device) that includes a machine-readable medium on which is stored one or more sets of instructions and data structures (e.g., software) embodying or utilized by any one or more of the methodologies or functions illustrated herein. The software may also reside, completely or at least partially, within the SRAM 2502 and/or within the CPU 2501 during execution thereof by the computer system 2500. The instructions may further be transmitted or received over the 10/100/1000 ethernet port 2505, USB port 2513 or some other suitable port illustrated herein.

In some example embodiments, a removable physical storage medium is shown to be a single medium, and the term "machine-readable medium" should be taken to include a single medium or multiple medium (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any of the one or more of the methodologies illustrated herein. The term "machine-readable medium" shall accordingly be taken to include, but not be limited to, solid-state memories, optical and magnetic medium, and carrier wave signals.

Data and instructions (of the software) are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the "true" spirit and scope of the invention.

What is claimed is:

1. A computer implemented method comprising:
   setting an error correction code (ECC) pattern for a local sub page of a local super page and a remote sub page of a remote super page;
   identifying, using a hypervisor, the remote super page and the local super page, wherein the remote super page includes the remote sub page and the local super page includes the local sub page;
   identifying an address of a virtual memory page, using the hypervisor, the address of the virtual memory page including address bits used to retrieve a page type bit flag value;
   applying an operation to the address of the virtual memory page, using the hypervisor, to retrieve the page type bit flag value; and
   identifying a page type, using the hypervisor, based upon the page type bit flag value, wherein the page type includes at least one of a super page and a sub page;
   allocating the virtual memory page as the local super page;
   requesting the remote sub page;
   detecting the ECC pattern for the remote sub page in response to the requesting of the remote sub page;
   determining whether the detected ECC pattern for the remote sub page matches a special ECC pattern denoting a sub page to be swapped on demand; and
   in response to determining that the detected ECC pattern matches the special ECC pattern, swapping the local sub page for the remote sub page using the hypervisor, the swapping occurring over a network and without transmitting the remote super page; and
   in response to determining that the detected ECC pattern does not match the special ECC pattern:
      identifying a further local sub page to be swapped with the local sub page; and
      swapping the local sub page with the further local sub page.

2. The computer implemented method of claim 1, further comprising mapping, using the hypervisor, a super page vector entry that includes the page type bit flag value to a page table that includes an entry for the virtual memory page, the entry for the virtual memory page including the page type bit flag value.

3. The computer implemented method of claim 1, wherein the address of the virtual memory page includes at least one of a Machine Address (MA), or a Virtual Memory Address (VMA).

4. The computer implemented method of claim 1, wherein the operation includes a bit shifting operation.

5. The computer implemented method of claim 1, further comprising:
   updating a page table entry, using the hypervisor, to reflect a change in the page type bit flag value; and
   updating a super page vector entry, using the hypervisor, to reflect the change in the page type bit flag value.

6. The computer implemented method of claim 5, wherein the change in the page type bit flag value reflects a change in the page type.

7. A computer implemented method comprising:
   setting an error correction code (ECC) pattern for a local sub page of a local super page and a remote sub page of a remote super page;
   identifying the remote super page using a hypervisor, the remote super page including the remote sub page;
   identifying the local super page using the hypervisor, the local super page including the local sub page;
   requesting the remote sub page;
   detecting the ECC pattern for the remote sub page in response to the requesting of the remote sub page;
   determining by the hypervisor whether the detected ECC pattern for the remote sub page matches a special ECC pattern denoting a sub page to be swapped on demand; and
   in response to determining that the detected ECC pattern matches the special ECC pattern, swapping the local sub page for the remote sub page using the hypervisor, the swapping occurring over a network and without transmitting the remote super page; and
   in response to determining that the detected ECC pattern does not match the special ECC pattern:
      identifying a further local sub page to be swapped with the local sub page; and
      swapping the local sub page with the further local sub page.

8. The computer implemented method of claim 7, further comprising allocating at least one virtual memory page as the local super page, and swapping sub pages on an as needed basis.

9. The computer implemented method of claim 7, triggering further sub page swapping in response to the determining that the detected ECC pattern matches the special ECC pattern.

10. The computer implemented method of claim 7, wherein the swapping of the local sub page with the further local sub page uses an I/O device driver in the hypervisor, the further local sub page including a mask virtual memory address.

11. The computer implemented method of claim 10, wherein the mask virtual memory address is a virtual memory address for the remote sub page.

12. A computer system comprising:
a compute blade comprising a hypervisor and a local super page, the local super page including a local sub page;
a memory blade comprising a remote super page, the remote super page including a remote sub page; and
a communication channel connecting the compute blade and the memory blade,
wherein the computer system is to:
request the remote sub page;
detect an error correction code (ECC) pattern for the remote sub page in response to the request for the remote sub page;
determine whether the detected ECC pattern for the remote sub page matches a special ECC pattern denoting a sub page to be swapped on demand;
in response to a determination that the detected ECC pattern matches the special ECC pattern, swap the local sub page for the remote sub page without transmitting the remote super page; and
in response to a determination that the detected ECC pattern does not match the special ECC pattern:
identify a further local sub page to be swapped with the local sub page; and
swap the local sub page with the further local sub page.

13. The computer system of claim 12, wherein the local super page comprises a plurality of local sub pages with contiguous addresses.

14. The computer system of claim 12, wherein the remote super page comprises a plurality of remote sub pages with contiguous addresses.

15. The computer system of claim 12, wherein the hypervisor comprises a super page vector and a page table.

16. The computer system of claim 15, wherein the super page vector comprises a data structure for storing page type bit flags representing a type of page for each page entry stored in the page table.

17. The computer system of claim 12, wherein the page table stores page entries, including the local super page.

* * * * *